United States Patent [19]
Pelletier et al.

[11] Patent Number: 5,619,119
[45] Date of Patent: Apr. 8, 1997

[54] METHOD OF PHASE-SHIFTING VOLTAGES APPLIED TO SUSCEPTANCES INTERCONNECTING TWO SYNCHRONOUS POLYPHASE AC NETWORKS AND A PHASE-SHIFTING INTERCONNECTING APPARATUS THEREOF

[75] Inventors: Pierre Pelletier; Jacques Brochu; François Beauregard, all of Boucherville; Gaston Morin, Carignan, all of Canada

[73] Assignee: Citeo, Varennes, Canada

[21] Appl. No.: 535,060

[22] PCT Filed: May 9, 1994

[86] PCT No.: PCT/CA94/00259

§ 371 Date: Nov. 1, 1995

§ 102(e) Date: Nov. 1, 1995

[87] PCT Pub. No.: WO94/27351

PCT Pub. Date: Nov. 24, 1994

Related U.S. Application Data

[63] Continuation-in-part of Ser. No. 61,512, May 14, 1993, abandoned.

[51] Int. Cl.⁶ .................................................. G05F 1/00
[52] U.S. Cl. ................................................ 323/215; 323/212
[58] Field of Search ................................... 323/212, 213, 323/215, 217; 327/2, 3, 233

[56] References Cited

U.S. PATENT DOCUMENTS

| | | | |
|---|---|---|---|
| 3,657,728 | 4/1972 | Mitsui et al. | 307/20 |
| 4,156,174 | 5/1979 | Specht | 323/43.5 R |
| 4,621,198 | 11/1986 | Roberge et al. | 307/82 |
| 4,661,763 | 4/1987 | Ari et al. | 323/215 |
| 4,792,744 | 12/1988 | Antoine | 323/217 |
| 4,983,856 | 1/1991 | Pelletier | 307/20 |
| 5,124,904 | 6/1992 | Paice | 363/3 |
| 5,461,300 | 10/1995 | Kappenman | 323/215 |

FOREIGN PATENT DOCUMENTS

| | | |
|---|---|---|
| 0152002 | 8/1985 | European Pat. Off. . |
| 394934 | 7/1933 | United Kingdom . |

OTHER PUBLICATIONS

J. Bladow et al., "Experiences with Parallel EHV Phase Shifting Transformers", IEEE Transactions on Power Delivery 6(3): 1096–1100 (1991).

T. Hirayama et al., "Developments of A.C. Type 'System Interconnectors'", IEEE Transactions on Power Apparatus and Systems PAS–G1(3): 1085–1092 (1972).

*Primary Examiner*—Matthew V. Nguyen
*Attorney, Agent, or Firm*—Foley & Lardner

[57] ABSTRACT

A phase-shifting interconnection apparatus for interconnecting respective phase lines of first and second synchronous polyphase AC networks, includes for each pair of respective phase lines subjected to an interconnection a pair of circuit branches in parallel, having first and second common branch points provided with connecting means for connecting respectively the branch points to the respective phase lines, the circuit branches including respectively inductive and capacitive susceptances; and series transformer for phase-shifting a voltage applied to at least one of said susceptances, the series transformer including at least one primary winding having at least a portion connected in series with the at least one of the susceptances, and at least one secondary winding having at least a portion adapted to receive an excitation voltage derived from the AC networks, the excitation voltage having a phase angle with respect to a phase voltage provided by one of the respective phase lines, whereby, in operation, the excitation voltage combines through the transformer with the phase voltage to cause phase-shifting of the voltage applied to the at least one of the susceptances.

21 Claims, 19 Drawing Sheets

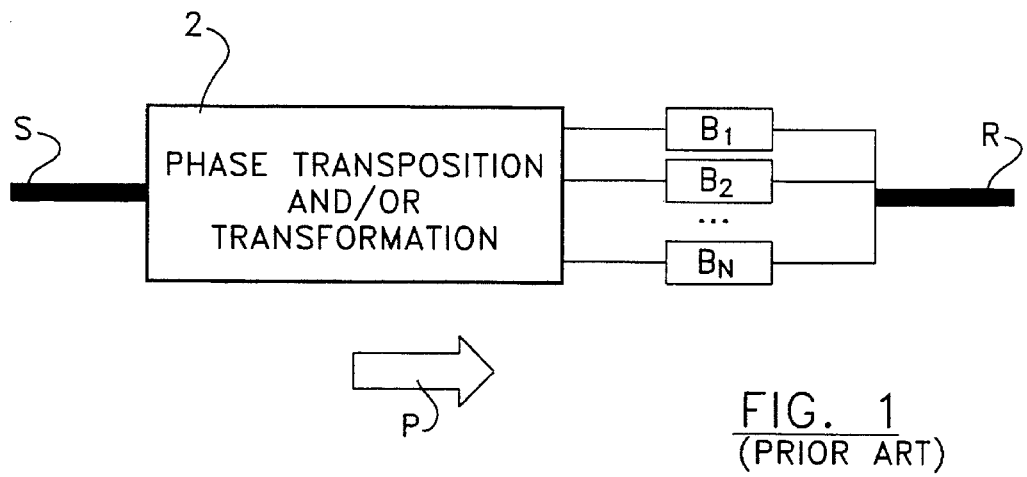
FIG. 1
(PRIOR ART)
FIG. 2
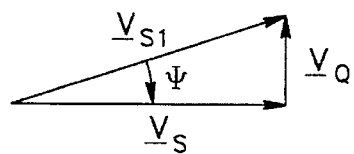
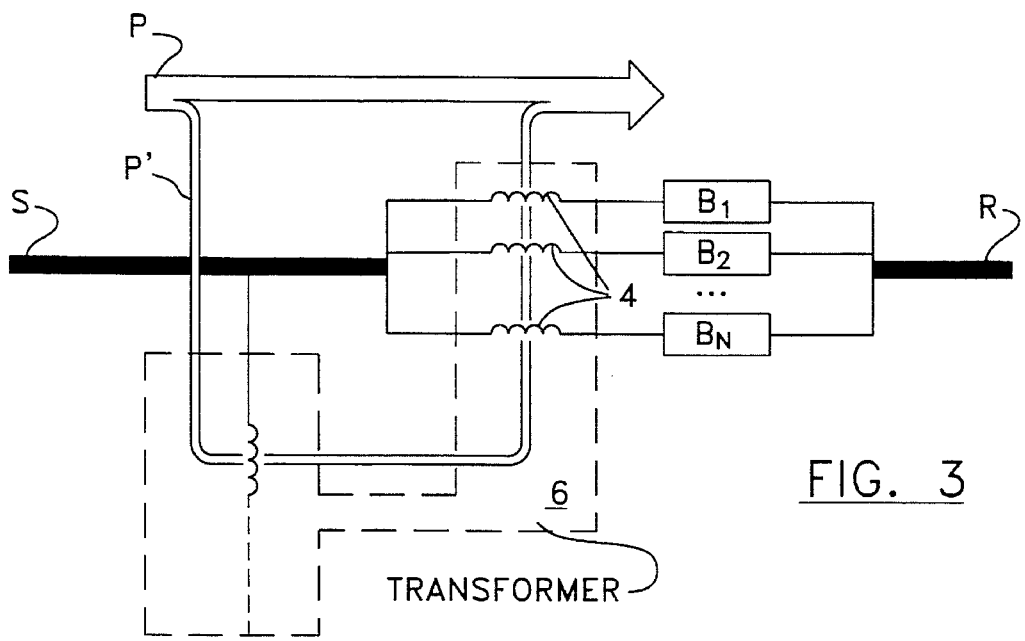
FIG. 3

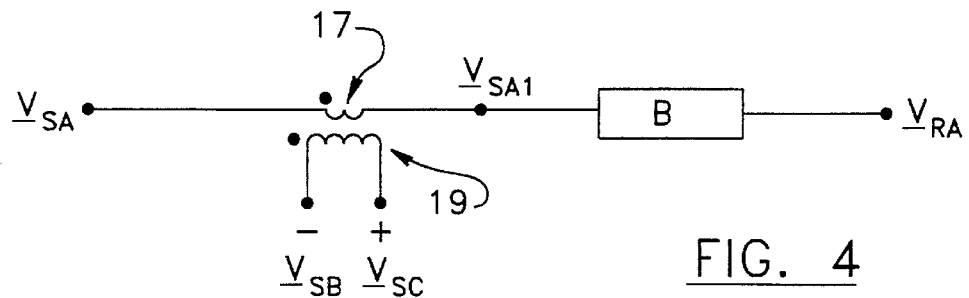
FIG. 4
FIG. 5
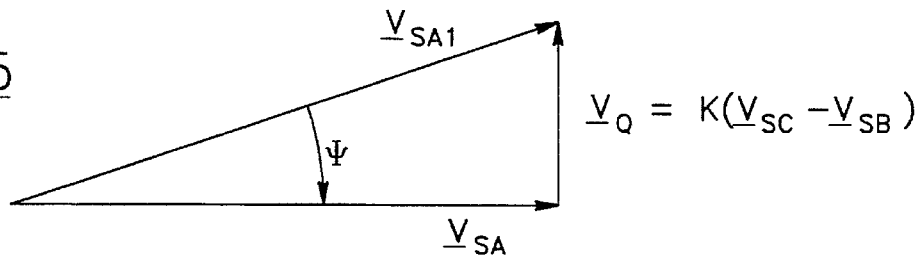
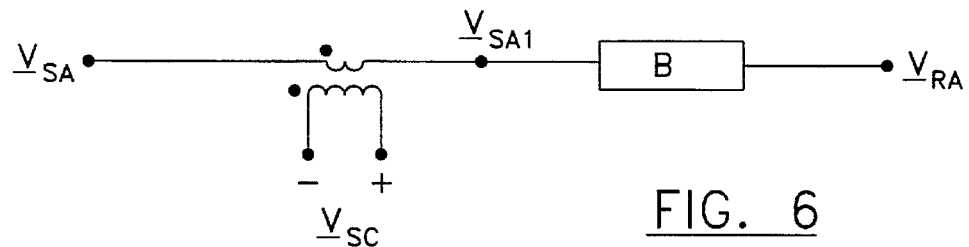
FIG. 6
FIG. 7
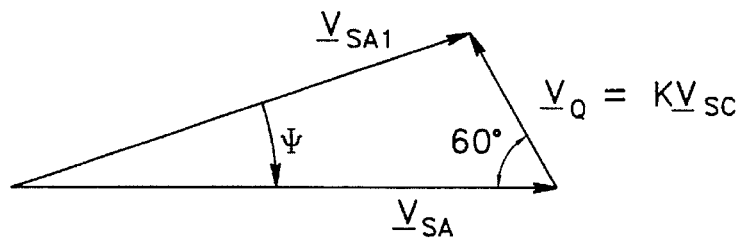

| TRANSIT DIRECTION | CONFIGURATION | $S_2$ | $S_1$ | $V_{SLA}$ | $\Psi_1$ | | $\Psi_2$ | | IDEAL $\delta_{SR}$ |
|---|---|---|---|---|---|---|---|---|---|
| | | | | | @ $|P|_{MIN}$ | @ $|P|_{MAX}$ | @ $|P|_{MIN}$ | @ $|P|_{MAX}$ | |
| P>0 | M30 | ① | B | $V_{PF}$ | −30° | −60° | −30° | − 0° | −60°...+ 0° |
| | CENTERED | ② | H | $V_{PA}$ | − 0° | −30° | + 0° | +30° | −30°...+30° |
| P<0 | P30 | ③ | H | $V_{PB}$ | +30° | +60° | +30° | + 0° | + 0°...+60° |
| | CENTERED | ② | B | $V_{PA}$ | + 0° | +30° | − 0° | −30° | −30°...+30° |

FIG. 34

METHOD OF PHASE-SHIFTING VOLTAGES APPLIED TO SUSCEPTANCES INTERCONNECTING TWO SYNCHRONOUS POLYPHASE AC NETWORKS AND A PHASE-SHIFTING INTERCONNECTING APPARATUS THEREOF

This application is a Continuation-in-part of Ser. No. 08/061,512 filed May 14, 1993 now abandoned.

BACKGROUND OF THE INVENTION

1. Field of the Invention

The invention generally relates to AC network interconnections using susceptances, and more specifically to a method of phase-shifting voltages applied to such susceptances, and to a phase-shifting interconnecting apparatus implementing the method to control power transfers between two synchronous polyphase AC networks.

2. Brief Description of the Related Art

Hitherto, phase shifted voltages applied to susceptances of prior AC network interconnecting apparatus are produced by means of phase transposition devices and/or a judicious selection of transformer windings (e.g. combinations of Y-y, Y-d1, Y-y6, etc, -connected windings). Thus, it is possible to provide multiple angles of voltage phase-shifts by step of 30° around a complete 360° range. This method however has the drawback to require a transformer dimensioned to sustain the circulation of the whole power transferred by the interconnecting apparatus.

Moreover, although a continuum of phase-shift angles around 360° can be obtained with partial zigzag combinations of transformer windings for the prior interconnecting apparatus, such topography is not considered in practice for reasons of efficiency.

OBJECT OF THE INVENTION

It is therefore an object of the invention to provide a method of phase-shifting voltages applied to susceptances used to interconnect two synchronous AC networks, and provide a phase-shifting interconnecting apparatus implementing the method to control power transfers between two synchronous polyphase AC networks, which overcome the above-mentioned drawbacks of the prior art methods and interconnecting apparatus.

Another object of the invention is to provide such a phase-shifting interconnecting apparatus using transformers having appreciable reduced sizes and MVA ratings with respect to the transformers required by the interconnecting apparatus of the prior art.

Another object of the present invention is to provide such a method which is effective and operative for a continuum of available phase-shift angles.

SUMMARY OF THE INVENTION

According to the present invention, there is provided a method of phase-shifting a voltage applied to at least one susceptance interconnecting a phase line of a first polyphase AC network with a corresponding phase line of a second polyphase AC network, both said AC networks being synchronous, comprising the steps of:

connecting at least a portion of a primary winding of a transformer in series with said susceptance, said transformer having also a secondary winding;

deriving from said AC networks, an excitation voltage having a phase angle with respect to a phase voltage provided by said phase line of the first AC network; and applying said excitation voltage to at least a portion of said secondary winding, whereby said excitation voltage combines through said transformer with said phase voltage to cause phase-shifting of said voltage applied to said susceptance.

Preferably, the method comprises the additional step of changing an angle of phase-shifting produced by said transformer. This step is preferably carried out either by adjusting said at least a portion of the primary winding connected in series with said susceptance, or by modulating an amplitude of said excitation voltage, for changing said phase-shifting.

According to the present invention, there is also provided a phase-shifting interconnecting apparatus for interconnecting respective phase lines of first and second synchronous polyphase AC networks, said apparatus comprising, for each pair of respective phase lines subjected to an interconnection:

a pair of circuit branches in parallel, having first and second common branch points provided with connecting means for connecting respectively said branch points to said respective phase lines, said circuit branches including respectively inductive and capacitive susceptances; and series transformer means for phase-shifting a voltage applied to at least one of said susceptances, said series transformer means including at least one primary winding having at least a portion connected in series with said at least one of said susceptances, and at least one secondary winding having at least a portion adapted to receive an excitation voltage derived from said AC networks, said excitation voltage having a phase angle with respect to a phase voltage provided by one of said respective phase lines, whereby, in operation, said excitation voltage combines through said transformer with said phase voltage to cause phase-shifting of the voltage applied to said at least one of said susceptances.

Preferably, the phase-shifting interconnecting apparatus further comprises means for changing an angle of phase-shifting produced by each said series transformer means.

In a preferred embodiment, these means for changing comprise a tap changer associated with each said at least one primary winding, to adjust said at least a portion thereof connected in series with said at least one of said susceptances.

In another preferred embodiment, these means for changing comprise excitation transformer means for modulating each said excitation voltage, said excitation transformer means having primary windings arranged respectively to receive phase voltages of said first AC network, and secondary windings provided with tap changers or adjusters, for producing respectively adjustable voltages in phase with the phase voltages of the first AC network, each said excitation voltage being derived from at least a corresponding one of said adjustable voltages.

BRIEF DESCRIPTION OF THE DRAWINGS

In order to impart full understanding of the manner in which these and other objectives are attained in accordance to the present invention, preferred embodiments thereof are described hereinafter with reference to the accompanying drawings wherein:

FIG. 1 is a schematic diagram illustrating the principle on which prior art interconnecting apparatus work;

FIG. 2 is a phase diagram showing a phase-shifting produced by injection of a voltage in quadrature according to the present invention;

FIG. 3 is a schematic diagram showing power flow in a phase-shifting interconnecting apparatus;

FIG. 4 shows a schematic diagram of a circuit branch of a phase-shifting interconnecting apparatus for injection of a voltage in quadrature;

FIG. 5 is a phase diagram showing voltage vectors involved in FIG. 4;

FIG. 6 is a schematic diagram of a circuit branch of a phase-shifting interconnecting apparatus for injection of a voltage having a phase angle of 120°;

FIG. 7 is a phase diagram showing voltage vectors involved in FIG. 6;

FIG. 34 is a table showing characteristics for each mode of operation of the phase-shifting interconnecting apparatus shown in FIG. 30;

DETAILED DESCRIPTION OF THE PREFERRED EMBODIMENTS

Figure 8:
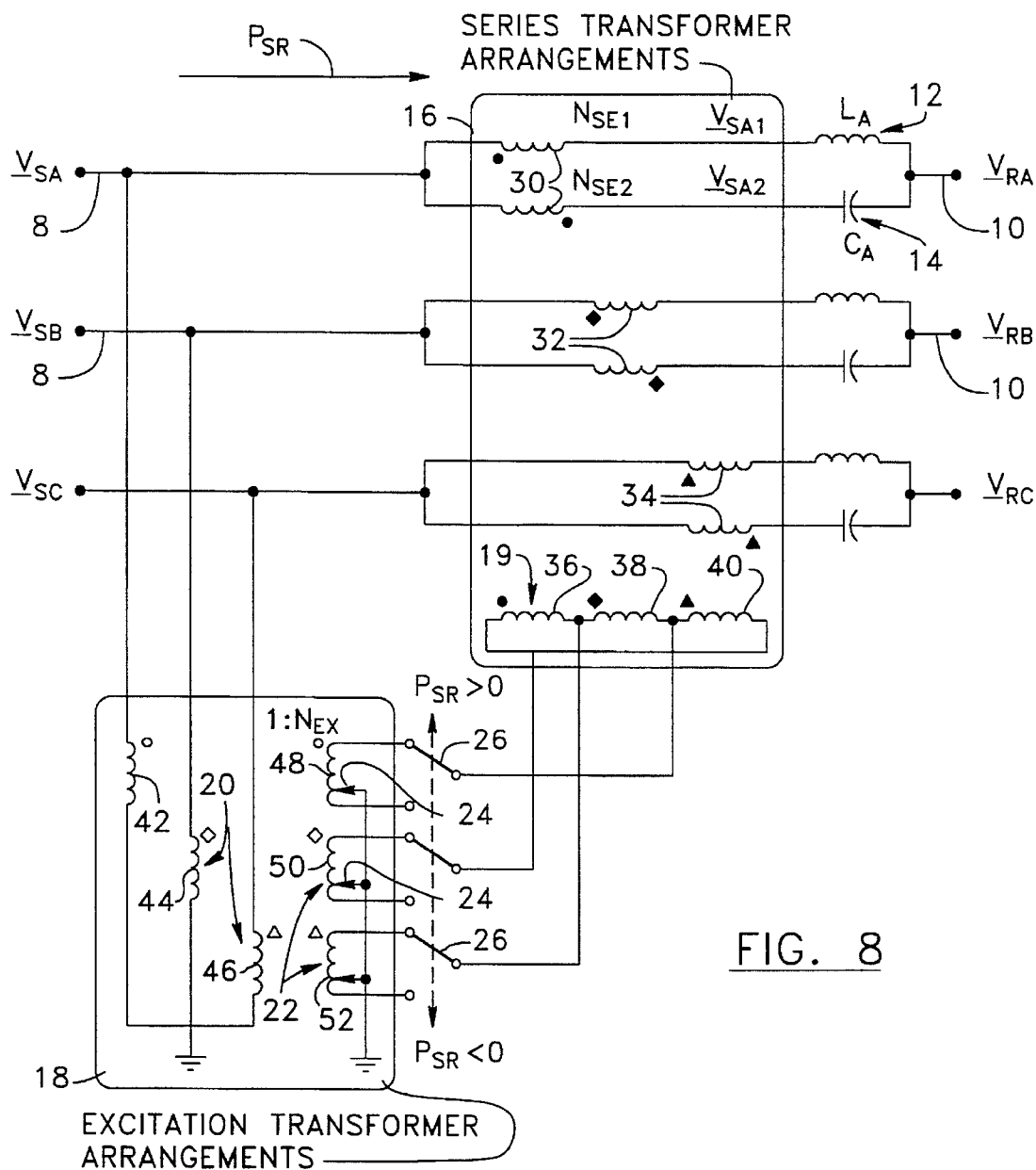
FIG. 8 is a circuit diagram showing a phase-shifting interconnecting apparatus for injection of voltages in quadrature using excitation transformer arrangements.

In the following description and in the drawings, like reference characters designate like or corresponding parts throughout the several views.

Referring to FIG. 1, there is shown a schematic diagram illustrating the principle on which prior art interconnecting apparatus work for controlling power conditions between a first three-phase AC network S (for source) and a second three-phase AC network R (for Receiver). The phase-shifted voltages applied to susceptances $B_1, B_2 \ldots, B_n$ (value which is normally equivalent to the imaginary part of the admittance but which takes here a broader meaning by designating a group of reactive elements which can be represented by a single capacitor or a single inductor in a schematic circuit diagram) of the interconnecting apparatus are produced by adequate phase transposition device and/or transformer with Y, Δ and/or zigzag (ZZ) -connected windings, as depicted by box 2. In such interconnecting apparatus, the whole power, as represented by arrow P, transferred from the AC network S to the AC network R flows throughout the phase transposition device and/or transformer 2 which must be dimensioned for this purpose.

Referring to FIGS. 2 and 3, the method according to the present invention involves phase-shifting mechanisms for producing phase-shifts ψ required by the susceptances $B_1, B_2 \ldots, B_n$. More particularly, the method consists in adding to a voltage $V_S$ derived for example from the AC network S a relatively small voltage $V_Q$ preferably in quadrature to obtain a resulting voltage $V_{S1}$ having a modulus approximately equal to the modulus of the voltage $V_S$ but with a different phase.

In practice, the small voltage $V_Q$ is generated by inducing in a primary winding 4 of a relatively small transformer 6 a phase-shifted fraction of a phase voltage of the AC network S. The primary winding 4 is connected in series with the considered susceptance $B_1, B_2 \ldots, B_n$. The voltage $V_{S1}$ upstream (on the side of the AC network S with respect to a susceptance) from the susceptance $B_1, B_2 \ldots, B_n$ results therefore from a vectorial addition of the phase voltage $V_S$ and the voltage $V_Q$ in the primary winding 4, and exhibits phase-shift characteristics as shown in FIG. 2. Since an interconnecting apparatus normally comprises several susceptances $B_1, B_2 \ldots, B_n$ (of capacitive and inductive types) to which are applied as many voltages from different phases, it is possible to use several primary windings 4 to produce the desired voltages (the primary windings 4 are generally associated with different phases).

Advantage of such a topography lies in appreciable size reduction of the transformer 6 and its MVA ratings since only a fraction P' of the power P transferred by the interconnecting apparatus flows in the transformer 6. This advantage prevails especially for small angles of phase shifts $\psi$. Another advantage lies in the fact that the available angles of phase shifts $\psi$ are not limited to multiple of 30°. Indeed, the modulus of the small voltage vector $V_Q$ can be modified by varying slightly the transformer ratios, changing thereby the phase-shifting effects. A continuum of angles of phase shifts $\psi$ is therefore available.

Referring to FIGS. 4, 5, 6 and 7, it must be understood that the small voltage $V_Q$ must not necessarily be at 90° (in quadrature) from the phase voltage $V_S$. Although the maximum efficiency is obtained with angle of voltage injection (addition of a small voltage to the phase voltage of a three-phase AC network for producing a new voltage generally having a similar modulus but with a different phase) substantially equal to 90°, it is possible for practical reasons that another angle is more appropriate. The case at 120° worth mentioning since it can be easily obtained from the voltage of another phase in a three-phase system. The injection at 120° has the advantage to limit the modulus increase of the voltage $V_{S1}$ when operating with large values of $\psi$. The injection at 90° is for its part obtained from the line—line voltage of two other phases (as $V_{SB}$, $V_{SC}$).

The fact to add a small voltage $V_Q$ in quadrature or at any other angle, in addition to the phase shift $\psi$, produces a small modification of the downstream (on the side of the AC network R with respect to a susceptance) voltage. The voltage $V_{S1}$ has a modulus different from the voltage $V_S$. In a classical phase-shifting device, such a difference in the modulus of the upstream and downstream voltages generates an undesirable current flow if the difference does not meet exactly the needs of the network. Indeed, when the phase-shifting device interconnects two powerful networks, only its low leakage impedance limits this current flow. In the same way, an inadequate adjustment of the phase shifts $\psi$ produces such a current flow.

Thus, for limiting this current, a classical phase-shifting device must continuously react to angular variations and even to variations of modulus. In some cases, a phase-shifting device having two degrees of freedom (modulus and angle) is required to carry out this task.

In the case of interconnecting apparatus, susceptances are inserted in series with the phase-shifting device. Their properties are to act as buffers to the voltage, modulus and angle variations of the AC network, and make the transfer of active and reactive power much less sensible to these variations. Similarly, a small difference of modulus between $V_S$ and $V_{S1}$ has almost no influence on the power transfer and can be therefore neglected, although its effects can be completely compensated by readjusting somewhat the values of the susceptances during design.

In a general context of the present invention, the method of phase-shifting a voltage (e.g. $V_{SA1}$) applied to at least one susceptance B interconnecting a phase line of a first polyphase AC network S with a corresponding phase line of a second polyphase AC network R, both AC networks being synchronous, comprises the steps of:

connecting at least a portion of a primary winding 17 of a transformer in series with the susceptance B;

deriving from the AC networks, an excitation voltage (e.g. $V_{SB}$–$V_{SC}$) having a phase shifted with respect to a phase voltage (e.g. $V_{SA}$) provided by the phase line of the first AC network S; and applying the excitation voltage to at least a portion of a secondary winding 19 of the transformer, whereby the excitation voltage combines through the transformer with the phase voltage to cause phase-shifting of the voltage applied to the susceptance B.

The method may comprise the additional step of changing an angle of phase-shifting produced by the transformer. This can be carried out for example either by adjusting the portion of the primary winding connected in series with the susceptance, or by modulating an amplitude of the excitation voltage, for changing the phase-shifting.

The way by which the method is applied will become more apparent in view of several preferred embodiments of phase-shifting interconnecting apparatus described hereinafter.

The excitation voltages can have for example phase angles of ±90° or ±120° with respect to the phase voltage $V_{SA}$ by selecting the appropriate manner to use the phase voltages provided by the AC networks. Various other phase angles are also available by means of these phase voltages or other voltages derived thereof.

The phase-shifting interconnecting apparatus can take various topologies as shown in the Figures, which are all just as well advantageous depending on the operating conditions of the AC networks S and R and the desired power transfers therebetween.

In a general context, the phase-shifting interconnecting apparatus interconnects respective phase lines (e.g. phases A—A, B—B, etc.) of first and second synchronous polyphase AC networks S, R. The apparatus comprises, for each pair of respective phase lines subjected to an interconnection, a pair of circuit branches in parallel, having first and second common branch points 8, 10 provided with connectors for connecting respectively the branch points 8, 10 to the respective phase lines. These circuit branches include respectively inductive and capacitive susceptances 12, 14. The apparatus also comprises a series transformer arrangement for phase-shifting a voltage applied to at least one of the susceptances 12, 14. This series transformer arrangement includes at least one primary winding 17 having at least a portion connected in series with one of the susceptances 12, 14, and at least one secondary winding 19 having at least a portion adapted to receive an excitation voltage derived from the AC networks so as to have a phase angle with respect to a phase voltage provided by one of the respective phase lines. In operation, the excitation voltage combines through the transformer with the phase voltage to cause phase-shifting of the voltage applied to the susceptance 12, 14.

Figure 23:
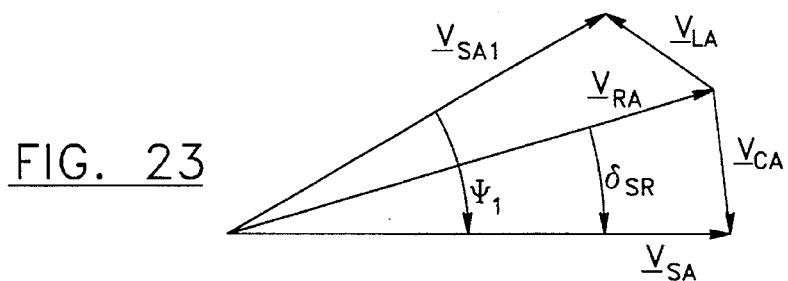
FIG. 23 is a phase diagram showing voltage vectors involved in FIG. 22.

The phase-shifting interconnecting apparatus can further comprises mechanisms for changing angles of phase-shifting produced by the series transformer arrangements. As shown in FIG. 23, these mechanisms may be obtained by means of tap changers 78 associated with the primary windings 30, 32, 34, to adjust portions thereof connected in series with the susceptances 12, 14. As shown in FIG. 8, these mechanisms may also be obtained by means of excitation transformer arrangements 18 for modulating each excitation voltage. The excitation transformer arrangements 18 have primary windings 20 for receiving respectively the phase voltages of the first AC network S, and secondary windings 22 provided with tap changers or ratio adjusters 24, for producing respectively adjustable voltages in phase with the phase voltages of the first AC network S. Each excitation voltage is derived from at least a corresponding one of the adjustable voltages. The phase-shift effects are thus adjustable by modulating amplitude of the adjustable voltages by means of the tap changers or ratio adjusters 24.

Referring to FIG. 8, there is shown a first embodiment of a phase-shifting interconnecting apparatus, for interconnecting three-phase AC networks, including first and second three-phase transformers providing respectively the series transformer arrangements 16 and the excitation transformer arrangements 18. The first three-phase transformer has three pairs of primary windings 30, 32, 34 magnetically coupled respectively with three Δ-connected secondary windings 36, 38, 40, while the second three-phase transformer has three primary windings 42, 44, 46 magnetically coupled respectively with three secondary windings 48, 50, 52 with grounded low voltage tap changers 26. Each of the primary windings 42, 44, 46 of the second three-phase transformer is connected between a ground and a corresponding one of the first branch points 8, and each of the secondary windings 48, 50, 52 of the second three-phase transformer is connected to a corresponding interconnecting point of the Δ-connected secondary windings 36, 38, 40 of the first three-phase transformer.

The use of the excitation transformer arrangements 18 allows modulation of the injected voltages by means of the tap changers 24 (or ratio adjusters or any other suitable devices). The phase shifts ψ and hence the power transfers of active and/or reactive power are thus variable. Inversion of the power flow $P_{SR}$ (to a power flow $P_{RS}$) is achieved at low voltage by means of power reversal switches 26 connected between the secondary windings 36, 38, 40 of the first three-phase transformer and the secondary windings 48, 50, 52 of the second three-phase transformer 18, for switching between two winding terminal connections of each secondary windings 48, 50, 52. In conjunction with the tap changers 24, the signs of the phase shifts ψ are thereby changed.

The turns ratios ($n_{SE1}$, $n_{SE2}$) of the primary windings 30, 32, 34 of the first three-phase transformer may be chosen with different values during construction of the phase-shift interphase power controller so as to obtain non-symmetrical phase shifts ψ for the inductive and capacitive susceptances 12, 14. In operation, however, the phase shifts ψ can only vary together since each of the pairs of primary windings 30, 32, 34 is coupled with a single corresponding common secondary winding 36, 38, 40, as depicted by symbols ●◆, ▲.

Figure 9:
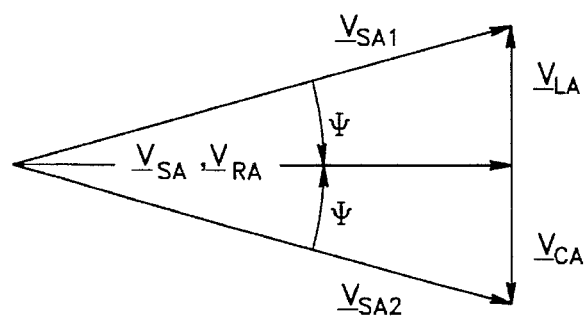
FIG. 9 is a phase diagram showing voltage vectors involved in FIG. 8.

Referring to FIG. 9, there is shown a phase diagram of upstream and downstream voltages $V_{SA}$, $V_{RA}$ (phase voltages), phase-shifted voltages $V_{SA1}$, $V_{SA2}$ and susceptance voltages $V_{LA}$, $V_{CA}$ for phase A of the phase-shifting interconnecting apparatus shown in FIG. 8 where the phase voltages $V_{SA}$, $V_{CA}$ are in phase.

Figure 10:
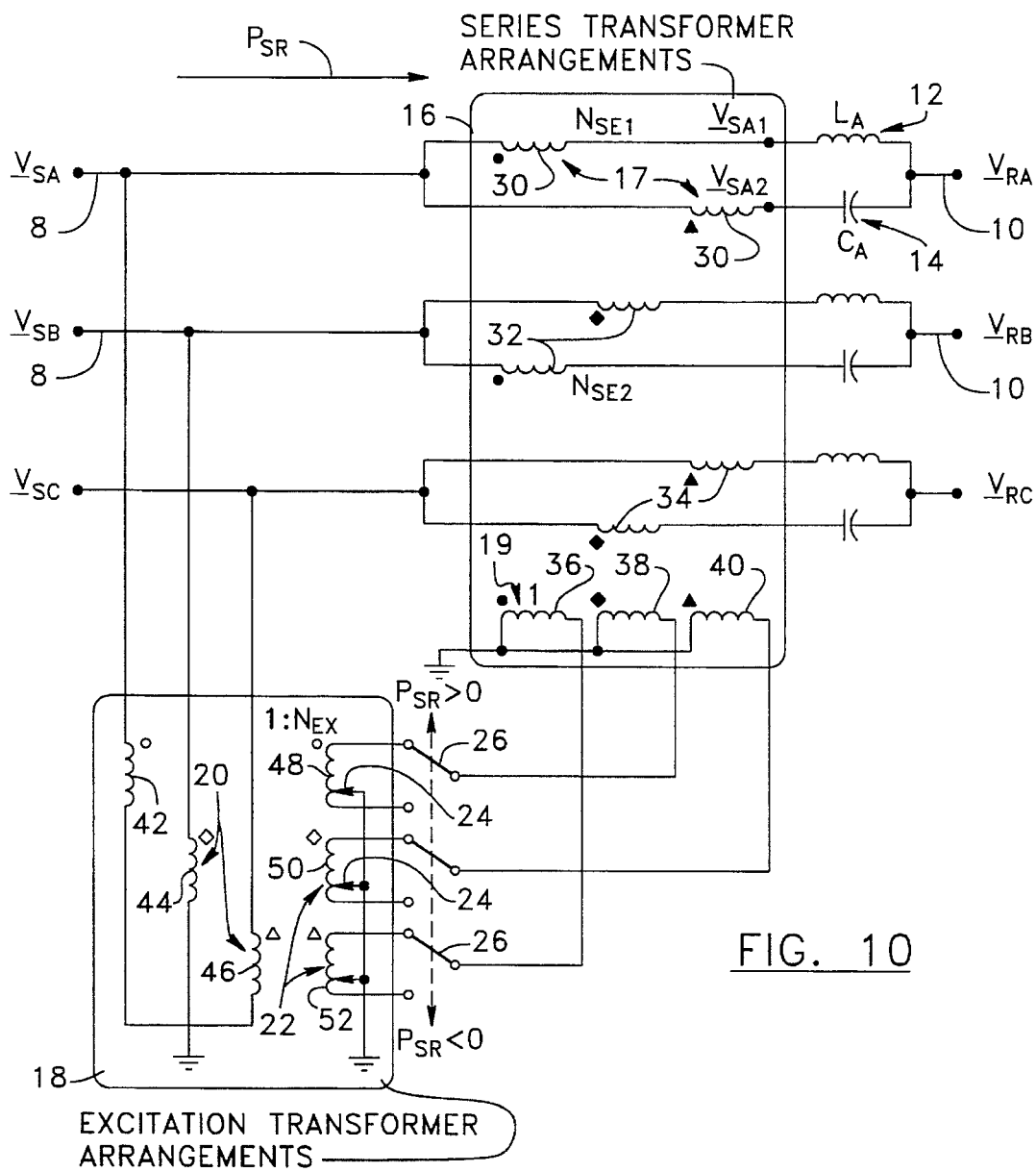
FIG. 10 is a circuit diagram showing a phase-shifting interconnecting apparatus for injection of voltages having phase angles of ±120° using excitation transformer arrangements.
Figure 11:
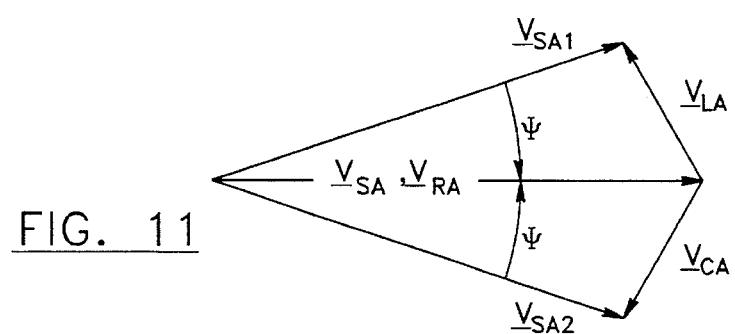
FIG. 11 is a phase diagram showing voltage vectors involved in FIG. 10.

Referring to FIG. 10, there is shown a second embodiment of a phase-shifting interconnecting apparatus, similar to the first embodiment with the few exception that the injection is carried out at 60° instead of in quadrature. The difference is in the manner to connect the series transformer arrangements 16. The turns ratios ($n_{SE1}$, $n_{SE2}$) of the primary windings 17 should be in that case revised to adapt the new excitation voltage obtained with this topography and the values of the susceptances 12, 14 should also be adjusted to take into account changes in the modulus of the phase-shifted voltages $V_{SA1}$ and $V_{SA2}$ as shown in the corresponding phase diagram of FIG. 11.

In this second embodiment, the first three-phase transformer providing the series transformer arrangements 16 has three pairs of primary windings 30, 32, 34 magnetically coupled respectively with three ground-connected secondary windings 36, 38, 40. The second three-phase transformer providing the excitation transformer arrangements 18 has three primary windings 42, 44, 46 magnetically coupled respectively with three secondary windings 48, 50, 52 with grounded tap changers 24. Each of the primary windings 42, 44, 46 of the second three-phase transformer are connected between a ground and a corresponding one of the first branch points 8, while each of the secondary windings 48, 50, 52 of the second three-phase transformer are connected to a corresponding one of the ground-connected secondary windings 36, 38, 40 of the first three-phase transformer.

Figure 12:
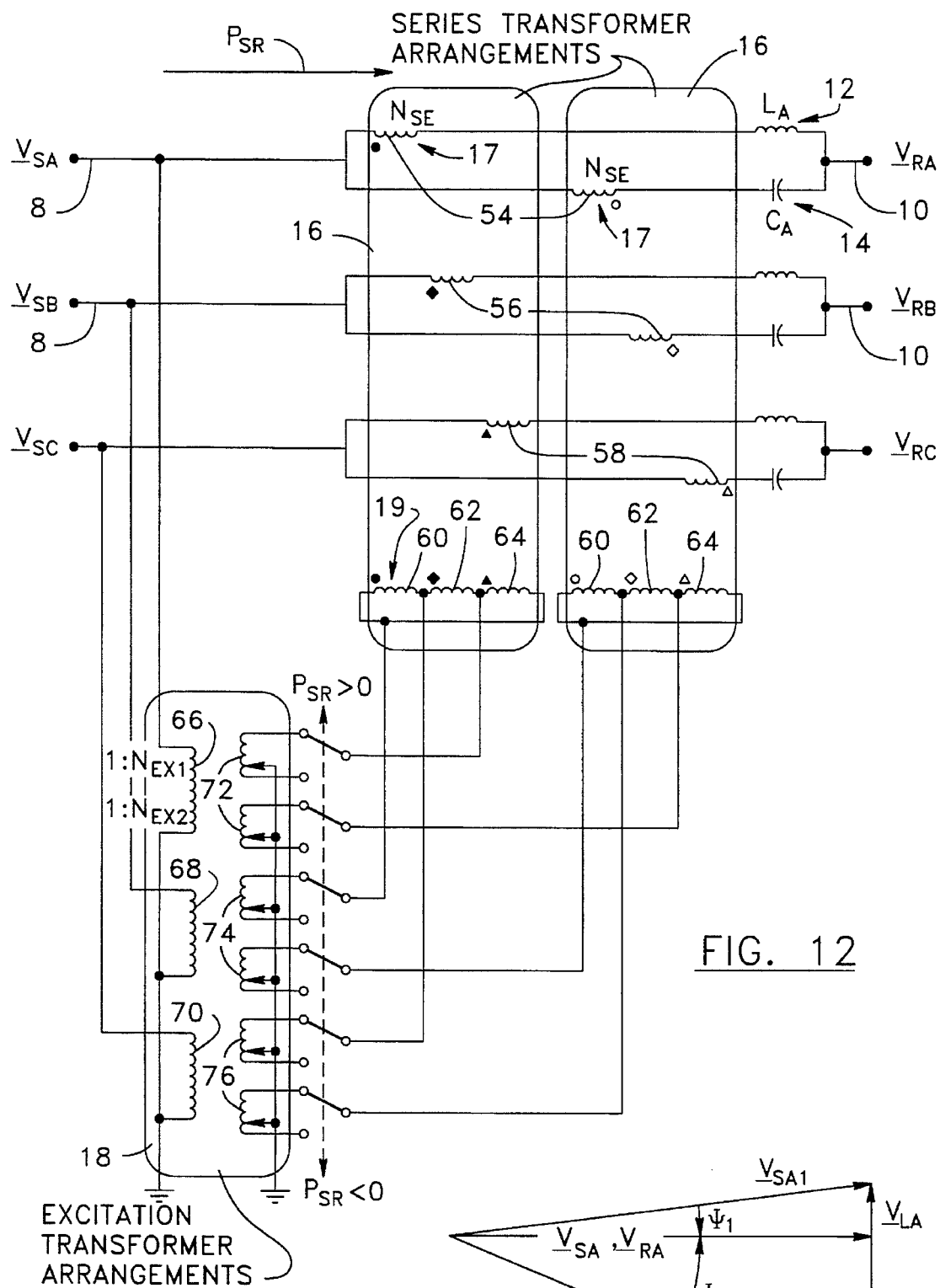
FIG. 12 is a circuit diagram showing a phase-shifting interconnecting apparatus for independent injection of voltages in quadrature using excitation transformer arrangements.
Figure 13:
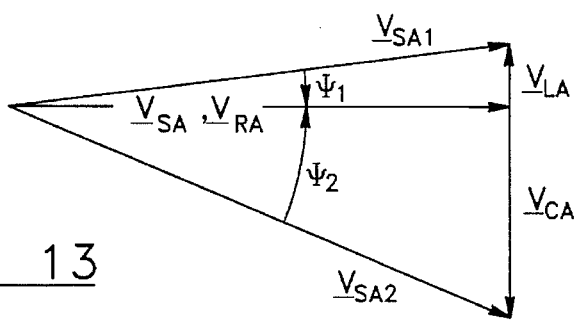
FIG. 13 is a phase diagram showing voltage vectors involved in FIG. 12.

Referring to FIG. 12, there is shown a third embodiment of a phase-shifting interconnecting apparatus, also similar to the first embodiment with the difference that the phase shifts ψ for the inductive and capacitive inductances 12, 14 are adjustable separately, as shown in the phase diagram of FIG. 13. For this purpose, first and second three-phase transformers provide the series transformer arrangement 16, each having three primary windings 54, 56, 58 magnetically coupled respectively with three Δ-connected secondary windings 60, 62, 64. A third three-phase transformer provides the excitation transformer arrangements 18, having three primary windings 66, 68, 70 magnetically coupled respectively with three pairs of secondary windings 72, 74, 76 with grounded tap changers 24. Each of the primary windings 66, 68, 70 of the third three-phase transformer are connected between a ground and a corresponding one of the first branch points 8, whereas each of the pairs of the secondary windings 72, 74, 76 of the third three-phase transformer are connected to corresponding interconnecting points of the Δ-connected secondary windings 60, 62, 64 of the first and second three-phase transformer respectively.

Figure 14:
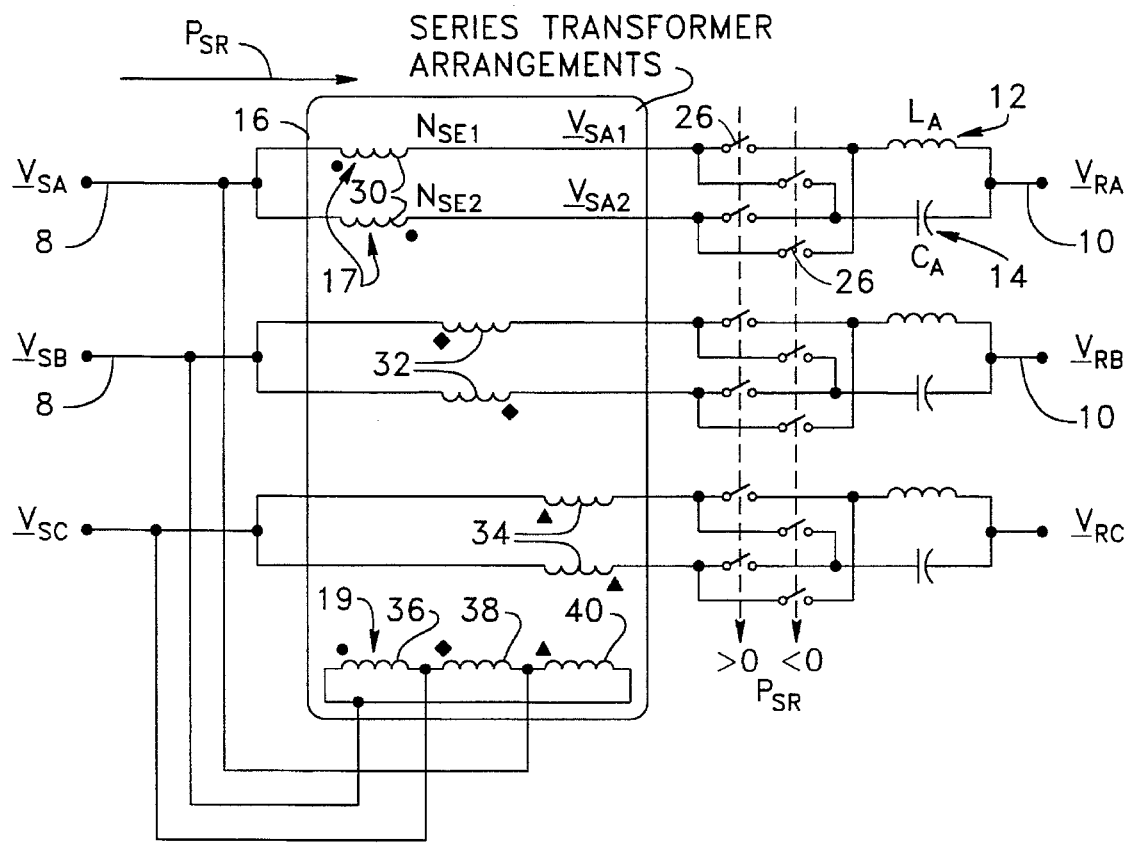
FIG. 14 is a circuit diagram showing a phase-shifting interconnecting apparatus for injection of voltages in quadrature without excitation transformer arrangements.
Figure 15:
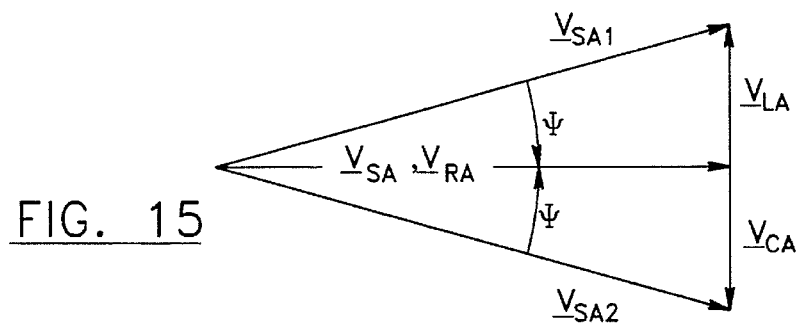
FIG. 15 is a phase diagram showing voltage vectors involved in FIG. 14.

Referring to FIG. 14, there is shown a forth embodiment of a phase-shifting interconnecting apparatus, which has no excitation transformer arrangement, and which exhibits the phase-shifting features as shown in FIG. 15. This topography is based on the fact that the phase-shifting interconnecting apparatus does not require precise adjustment of its series transformer arrangements 16. In a case where various operating points are not needed by the expedient of the phase shifts ψ, the excitation transformer arrangements 18 (as shown in FIG. 8) can be removed since their tap changers 24 become useless. The secondary windings of the series transformer arrangements 16 can then be directly powered from the upstream voltages $V_{SA}$, $V_{SB}$, $V_{SC}$ (phase voltages) of the first AC network S, saving thus as many MVA of transformation. With the exception of absence of excitation transformer arrangements and a relocation of the power reversal switches 26, this topology of the phase-shifting interconnecting apparatus also resembles the first embodiment. If a row of power operating points is nevertheless desired, it remains still possible to provide groups of discrete susceptances selectable by means of suitable switches (not shown) as in the case of classical interconnecting apparatus.

The three-phase transformer providing the series transformer arrangements has three pairs of primary windings 30, 32, 34 magnetically coupled respectively with three Δ-connected secondary windings 36, 38, 40. Each of the first branch points 8 are connected to a corresponding interconnecting point of the Δ-connected secondary windings 36, 38, 40 of the three-phase transformer. The power reversal switches 26 are connected between the primary windings 17 and the susceptances 12, 14, for switching positions of the susceptances 12, 14 with respect to the primary windings 17.

Figure 16:
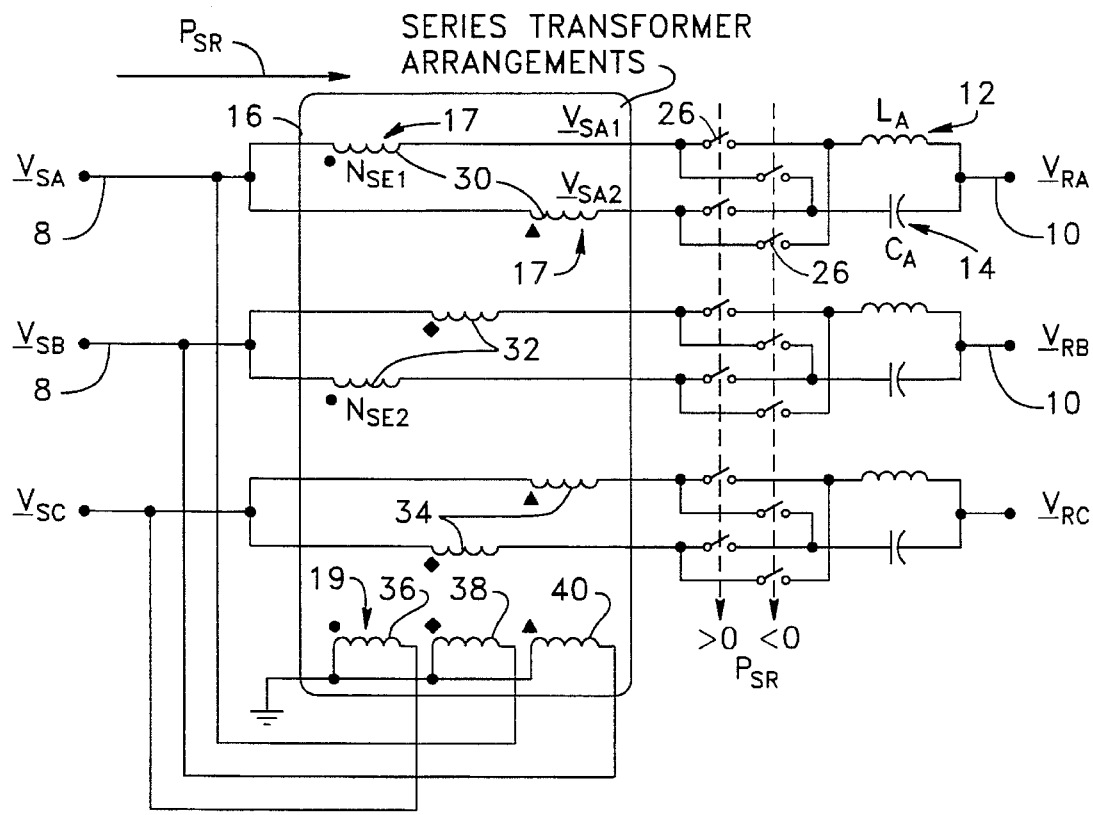
FIG. 16 is a circuit diagram showing a phase-shifting interconnecting apparatus for injection of voltages having phase angles of ±120° without excitation transformer arrangements.
Figure 17:
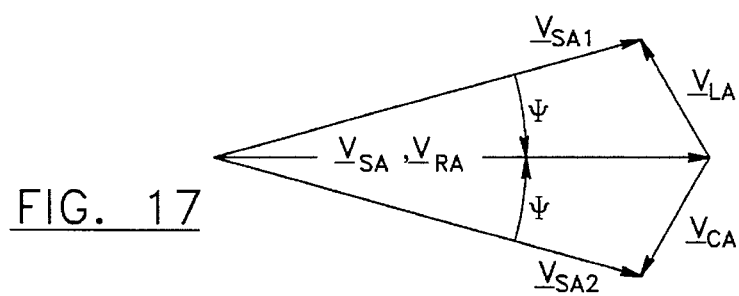
FIG. 17 is a phase diagram showing voltage vectors involved in FIG. 16.

Referring to FIG. 16, there is shown a fifth embodiment of a phase-shifting interconnecting apparatus, which also has no excitation transformer arrangement, and which exhibits the phase-shifting features as shown in FIG. 17. Hence, this topography combines the properties and characteristics of the phase-shift interconnecting apparatus shown in FIGS. 10 and 14.

The three-phase transformer providing the series transformer arrangements 18 has three pairs of primary windings 30, 32, 34 magnetically coupled respectively with three ground-connected secondary windings 36, 38, 40. Each of the first branch points 8 are connected to a corresponding one of the ground-connected secondary windings 36, 38, 40 of the three-phase transformer.

Figure 18:
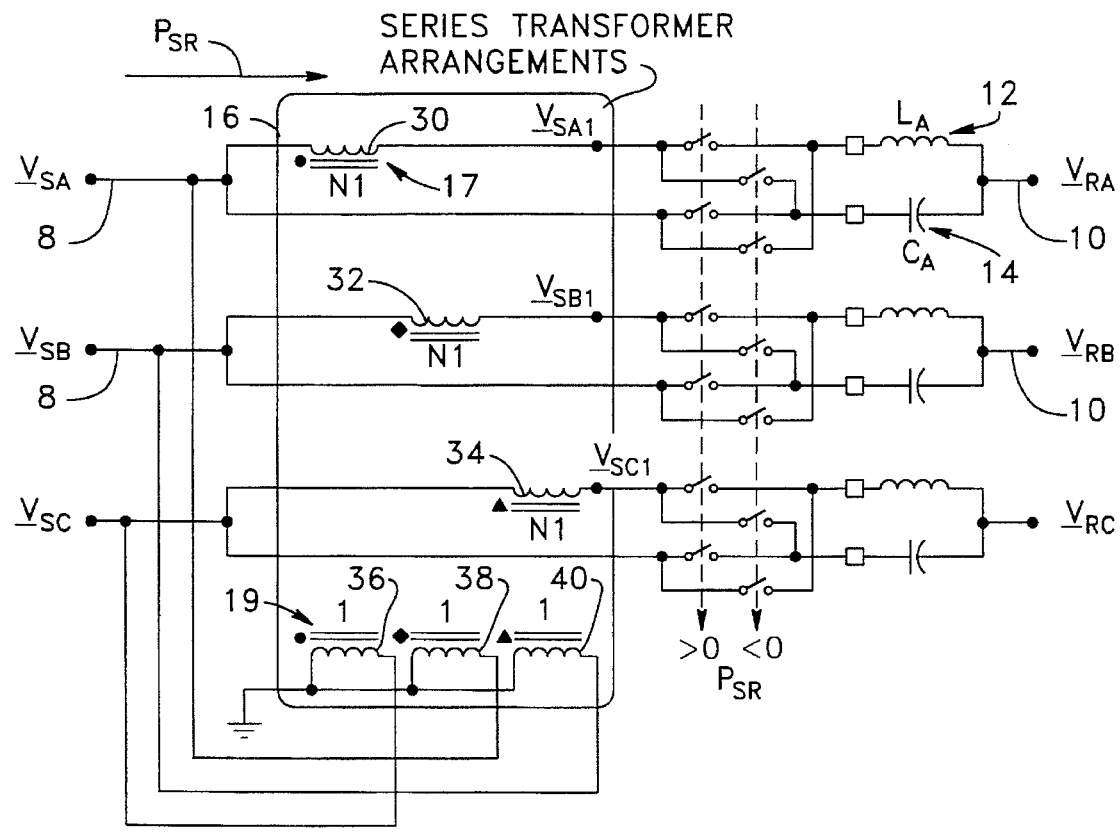
FIG. 18 is a circuit diagram showing a phase-shifting interconnecting apparatus for injection of a single voltage per interconnecting circuit branch.
Figure 19:
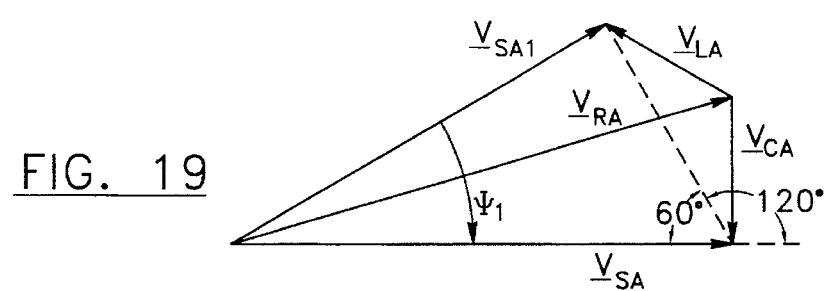
FIG. 19 is a phase diagram showing voltage vectors involved in FIG. 18.

Referring to FIG. 18, there is shown a sixth embodiment of a phase-shift interphase power controller, which also has no excitation transformer arrangement, and which exhibits the phase-shifting features as shown in FIG. 19. Hence, this topography resembles the embodiment of FIG. 16, with the difference that only one phase-shifting is produced for only one of the two susceptances 12, 14.

Figure 20:
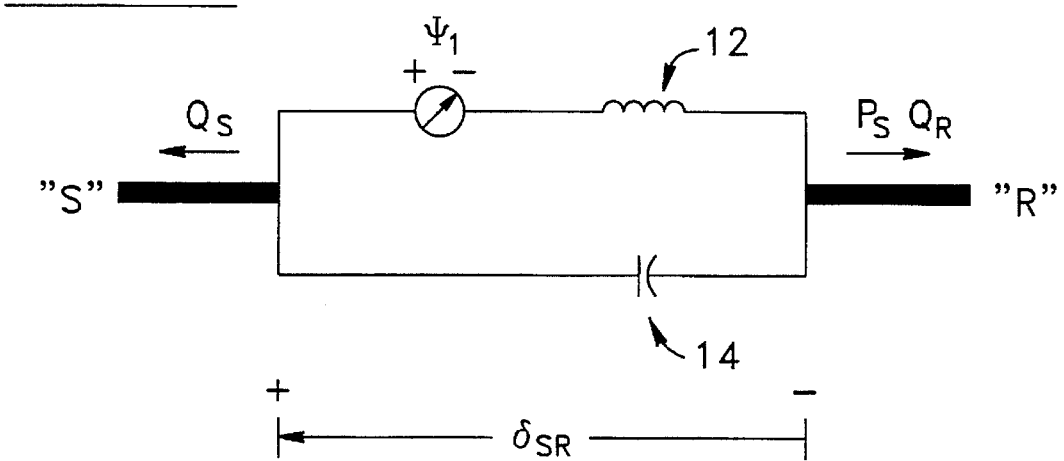
FIGS. 20 and 21 are schematic diagram of circuit branches of a phase-shifting interconnecting apparatus, for injection of a single voltage.
Figure 21:
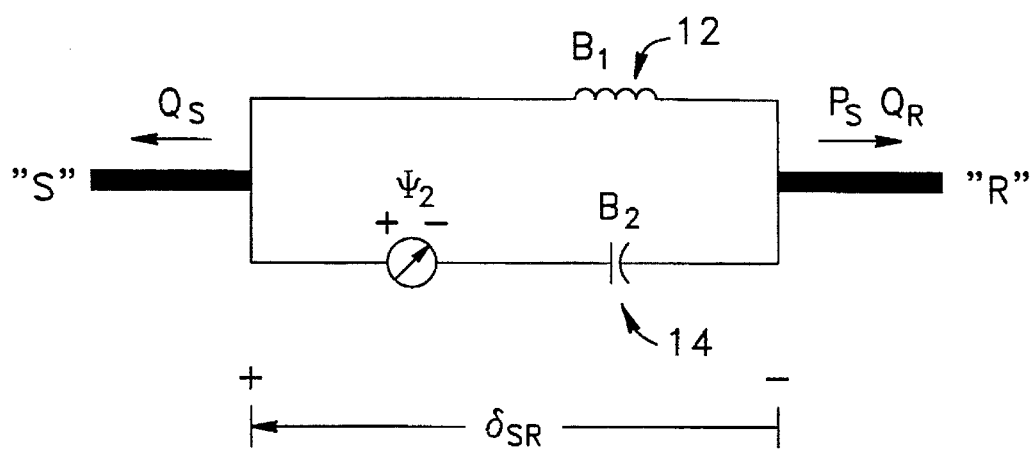

Referring to FIGS. 20 and 21, there are shown schematic diagrams of circuit branches of a phase-shifting interconnecting apparatus, for phase-shifting a single voltage applied either on the inductive or capacitive susceptance. The three-phase power transferred by the apparatus of FIG. 20 is given by:

$$P = P_{nom} \cos\left(\delta_{sr} - \frac{\psi_1}{2}\right) \quad (1)$$

where $$P_{nom} = 2 \cdot 3 V_s V_r B_1 \sin\frac{\psi_1}{2} \quad \text{and} \quad B_2 = -B_1 \quad (2)$$

For the apparatus of FIG. 21, the three-phase power transferred is given by:

$$P = P_{nom} \cos\left(\delta_{sr} - \frac{\psi_2}{2}\right) \quad (3)$$

where:

$$P_{nom} = 2 \cdot 3 V_s V_r B_2 \sin\frac{\psi_2}{2} \quad \text{and} \quad B_2 = -B_1 \quad (4)$$

For a power circulation from left to right, $\psi_1 < 0 < \psi_2$. The power, voltage and susceptance values are respectively in watts, volts and mhos. $V_S$ and $V_R$ represent respectively the phase-ground voltages of the AC networks S and R.

Figure 22:
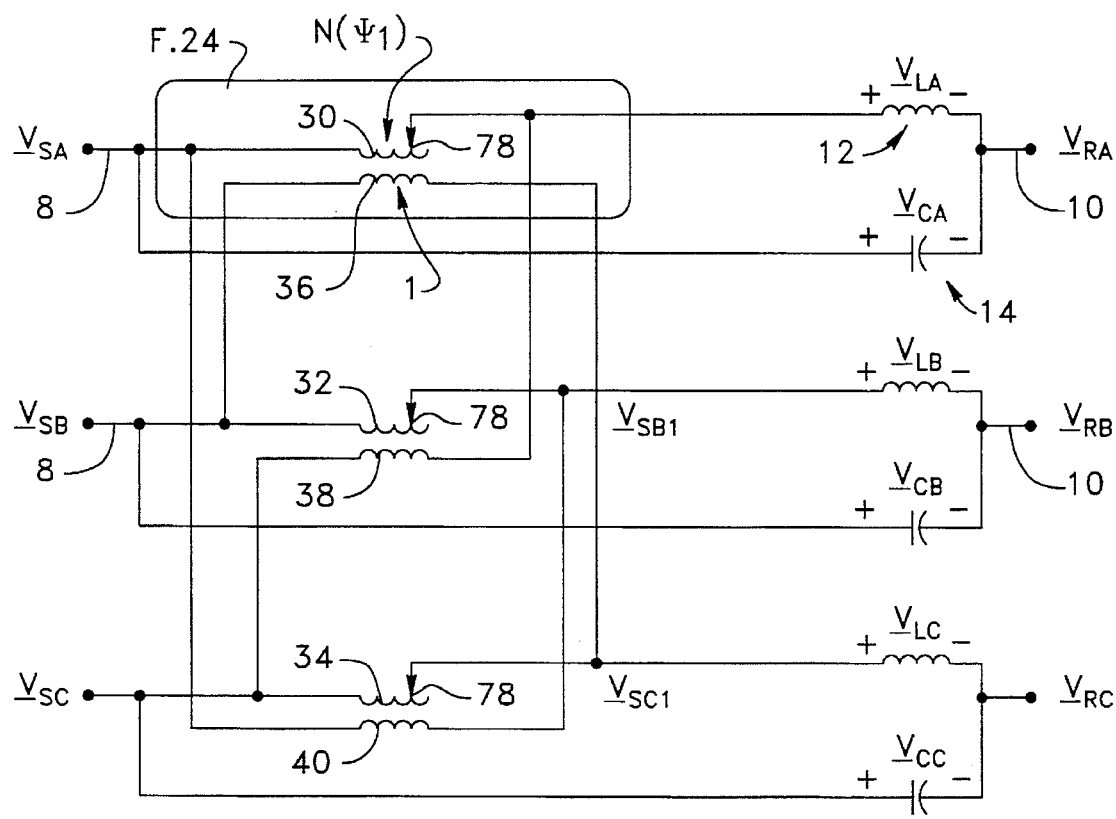
FIG. 22 is a circuit diagram showing a phase-shifting interconnecting apparatus having phase-shifting transformer arrangements in a squashed delta configuration.

Referring to FIG. 22, there is shown another embodiment of a phase-shifting interconnecting apparatus having phase-shifting transformer arrangements in a squashed delta configuration. This configuration matches advantageously the network characteristics and provides the phase-shifting features shown by the phase diagram in FIG. 23, which are given by:

$$n(\psi_1) = \frac{\sin\left(\frac{-\psi_1}{2}\right)}{\sin\left(60° + \frac{\psi_1}{2}\right)} \quad (5)$$

All of the series transformer arrangements are provided by a three-phase transformer having three primary windings 30, 32, 34 magnetically coupled respectively with three secondary windings 36, 38, 40. Each of the primary windings 30, 32, 34 is provided with a tap terminal 78 connected to a corresponding one of the susceptances 12, 14. Each of the secondary windings 36, 38, 40 is connected between a corresponding one of the first branch points 8 and one of the tap terminals 78.

Figure 24:
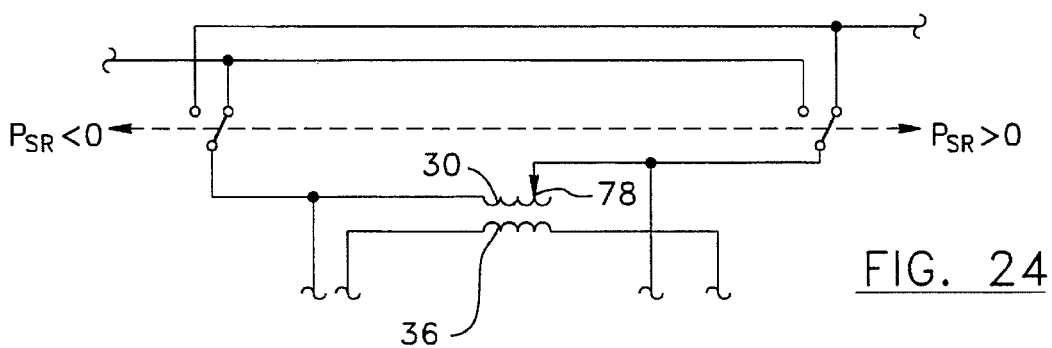
FIG. 24 is a schematic diagram showing a power reversal switch circuit for the phase-shifting interconnecting apparatus shown in FIG. 22.

Referring to FIG. 24, there is shown a power reversal switch circuit specially adapted for the phase-shifting interconnecting apparatus shown in FIG. 22. The switch circuit simply interchanges the series connections of the primary windings 30, 32, 34 to reverse the power flow.

Figure 25:
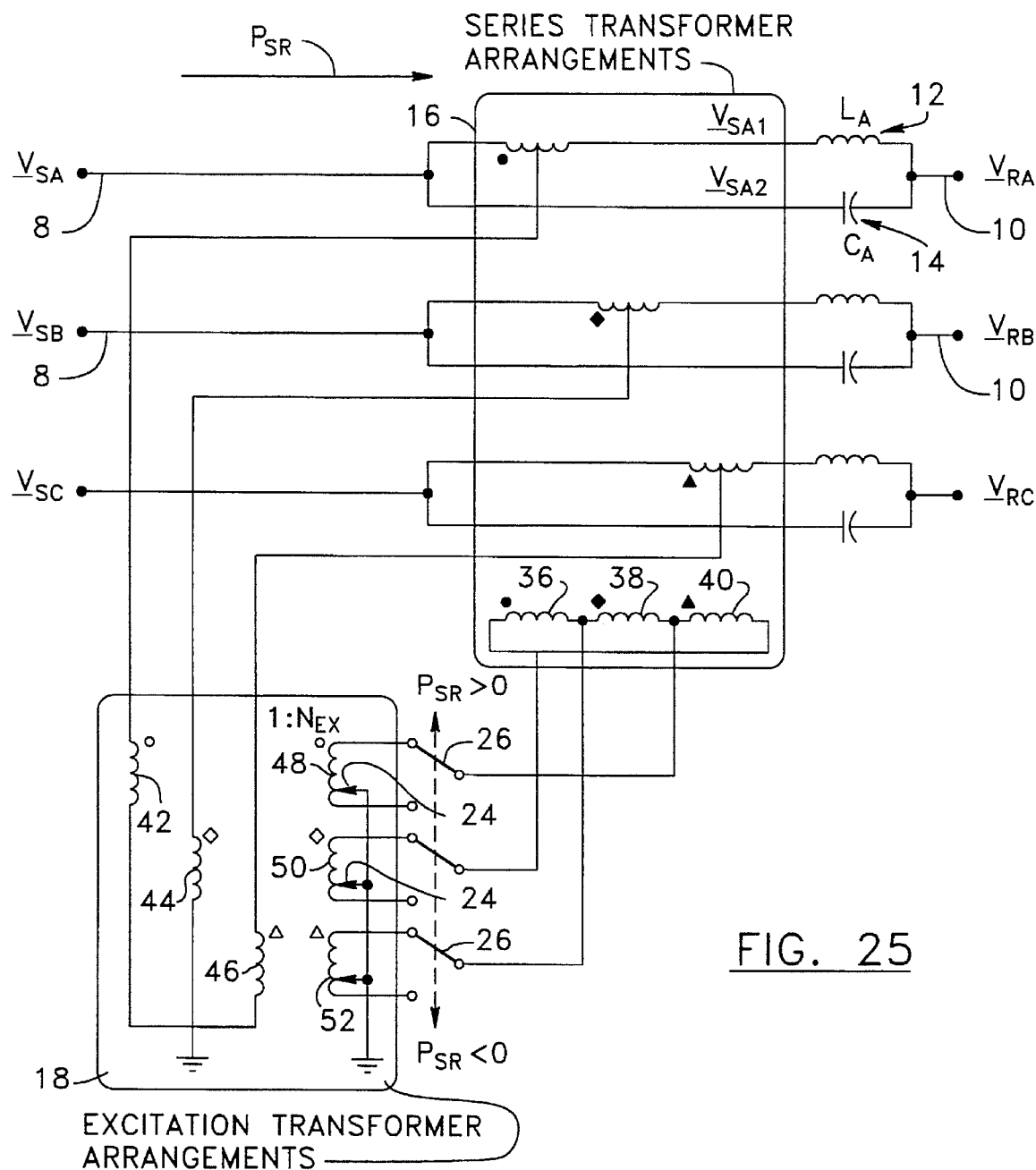
FIG. 25 is a circuit diagram showing a phase-shifting interconnecting apparatus having phase-shifting transformer arrangements in a Mersereau configuration.
Figure 26:
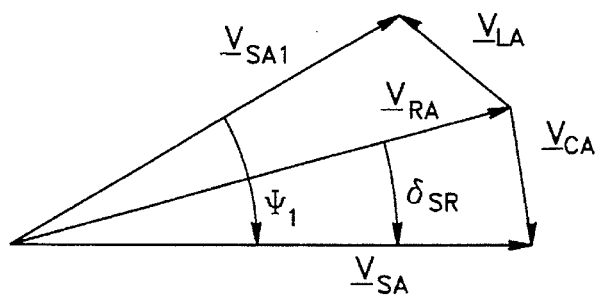
FIG. 26 is a phase diagram showing voltage vectors involved in FIG. 25.

Referring to FIG. 25, there is shown a phase-shifting interconnecting apparatus having phase-shifting transformer arrangements in a Mersereau configuration. All of the series transformer arrangements 16 are provided by a first three-phase transformer having three primary windings 30, 32, 34 magnetically coupled respectively with three Δ-connected secondary windings 36, 38, 40. All of the excitation transformer arrangements 18 are provided by a second three-phase transformer having three primary windings 42, 44, 46 magnetically coupled respectively with three secondary windings 48, 50, 52 with grounded tap changers 24. Each of the primary windings 30, 32, 34 of the first three-phase transformer is provided with a tap terminal 25. Each of the primary windings 42, 44, 46 of the second three-phase transformer is connected between a ground and a corresponding one of the tap terminals 25. Each of the secondary windings 48, 50, 52 of the second three-phase transformer is connected to a corresponding interconnecting point of the Δ-connected secondary windings 36, 38, 40 of the first three-phase transformer. The phase-shifting features of this interconnecting apparatus are shown in FIG. 26. The global ratio (i.e. the combined ratio of the first and second three-phase transformers) of the turns between the series windings 30, 32, 34 of the series transformer arrangements 16 and the primary windings 42, 44, 46 of the excitation transformer arrangements 18 is given by:

$$n(\psi_1) = 2\tan\frac{-\psi_1}{2} \quad (6)$$

Figure 27:
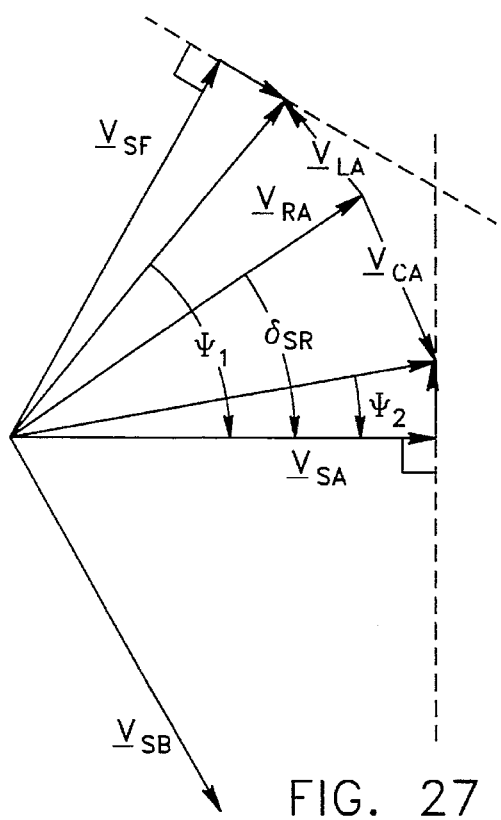
FIGS. 27, 28 and 29 are phase diagrams showing voltage vectors relative to 3 modes of operation of a phase-shifting interconnecting apparatus for hexaphase AC networks.
Figure 28:
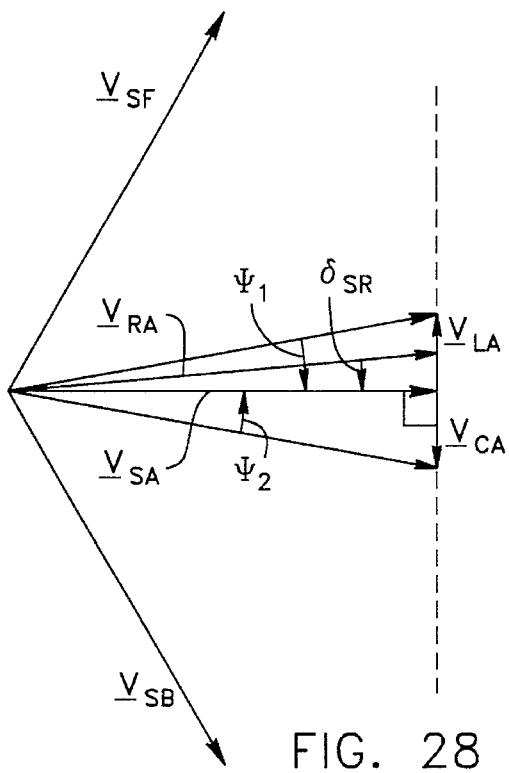
Figure 29:
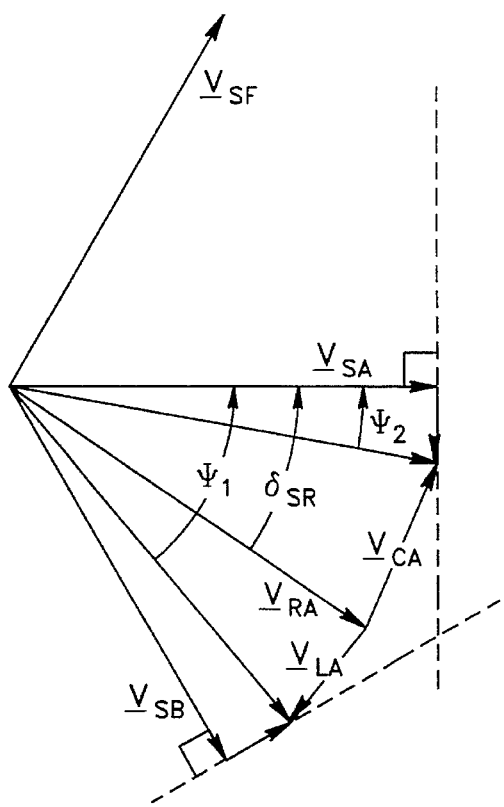

Referring to FIGS. 27, 28 and 29, there are shown phase diagrams of voltage vectors relative to 3 modes of operation of a phase-shifting interconnecting apparatus for hexaphase AC networks, namely a "M30" mode where $V_{SA}$ has a phase angle around −30° with respect to $V_{RA}$, a "Centered" mode where $V_{SA}$ has a phase angle around 0° with respect to $V_{RA}$, and a "P30" mode where $V_{SA}$ has a phase angle around +30° with respect to $V_{RA}$.

Figure 30:
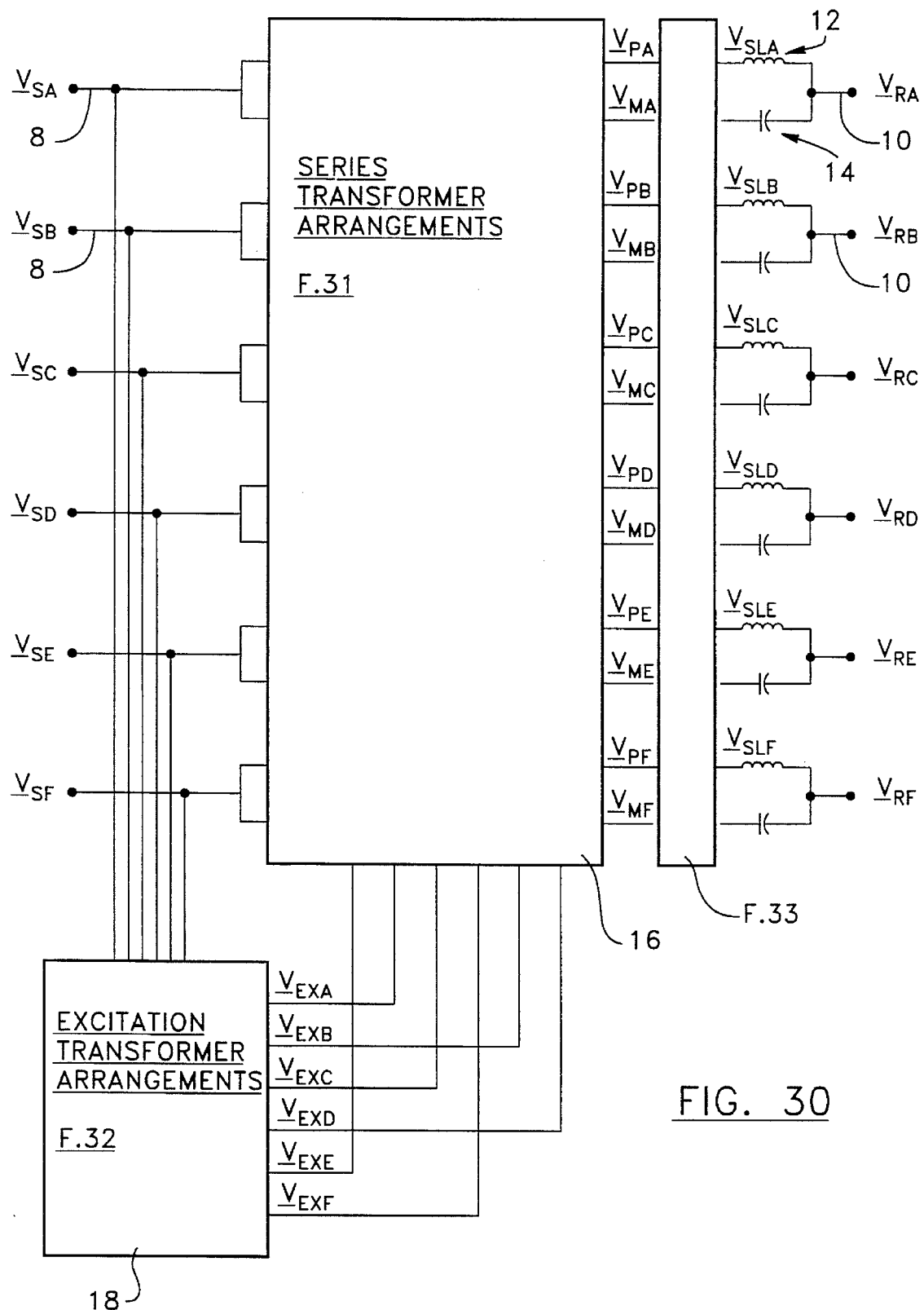
FIG. 30 is a schematic diagram showing a phase-shifting interconnecting apparatus for hexaphase AC networks.
Figure 31:
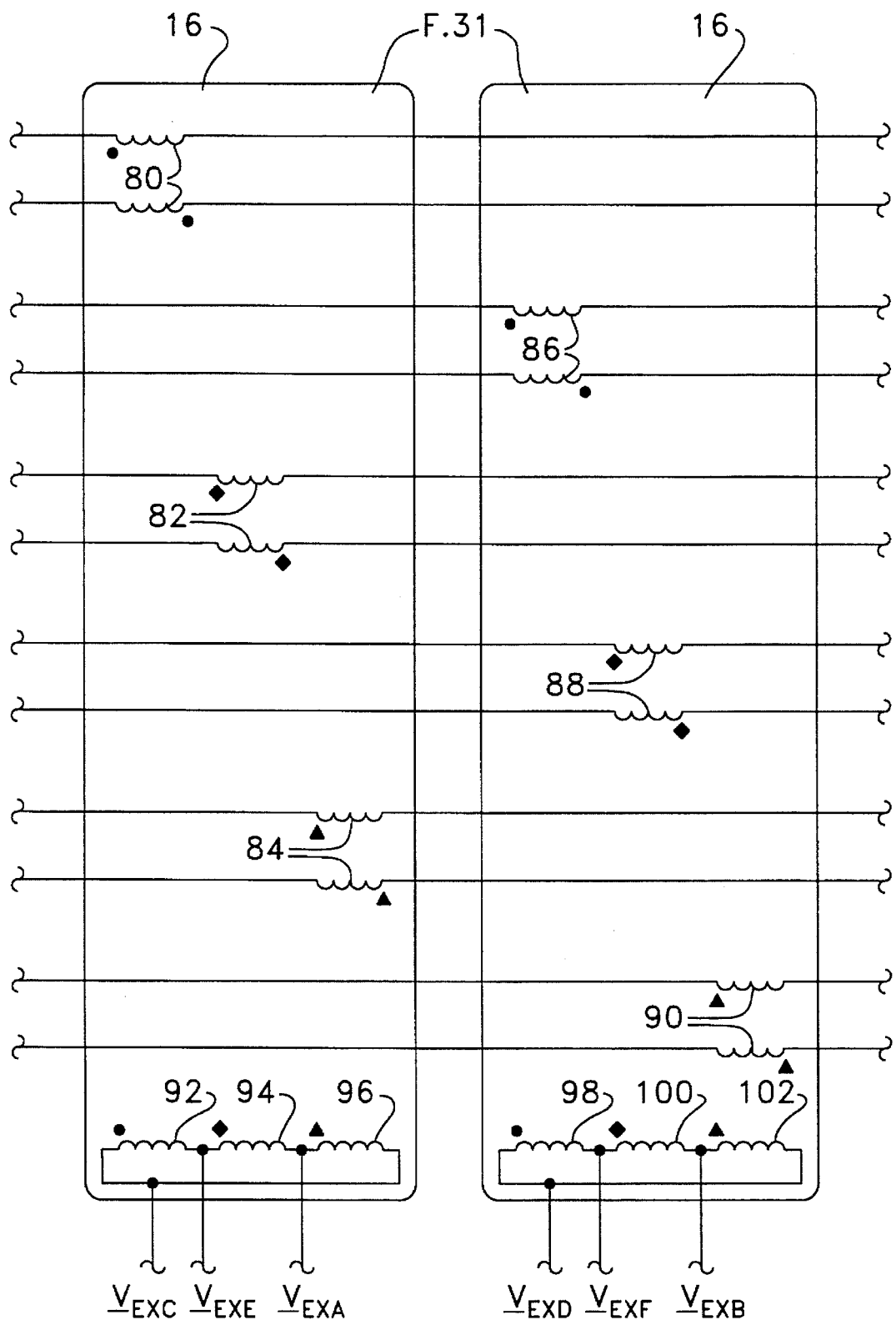
FIG. 31 is a circuit diagram showing series transformer arrangements for the phase-shifting interconnecting apparatus shown in FIG. 30.
Figure 32:
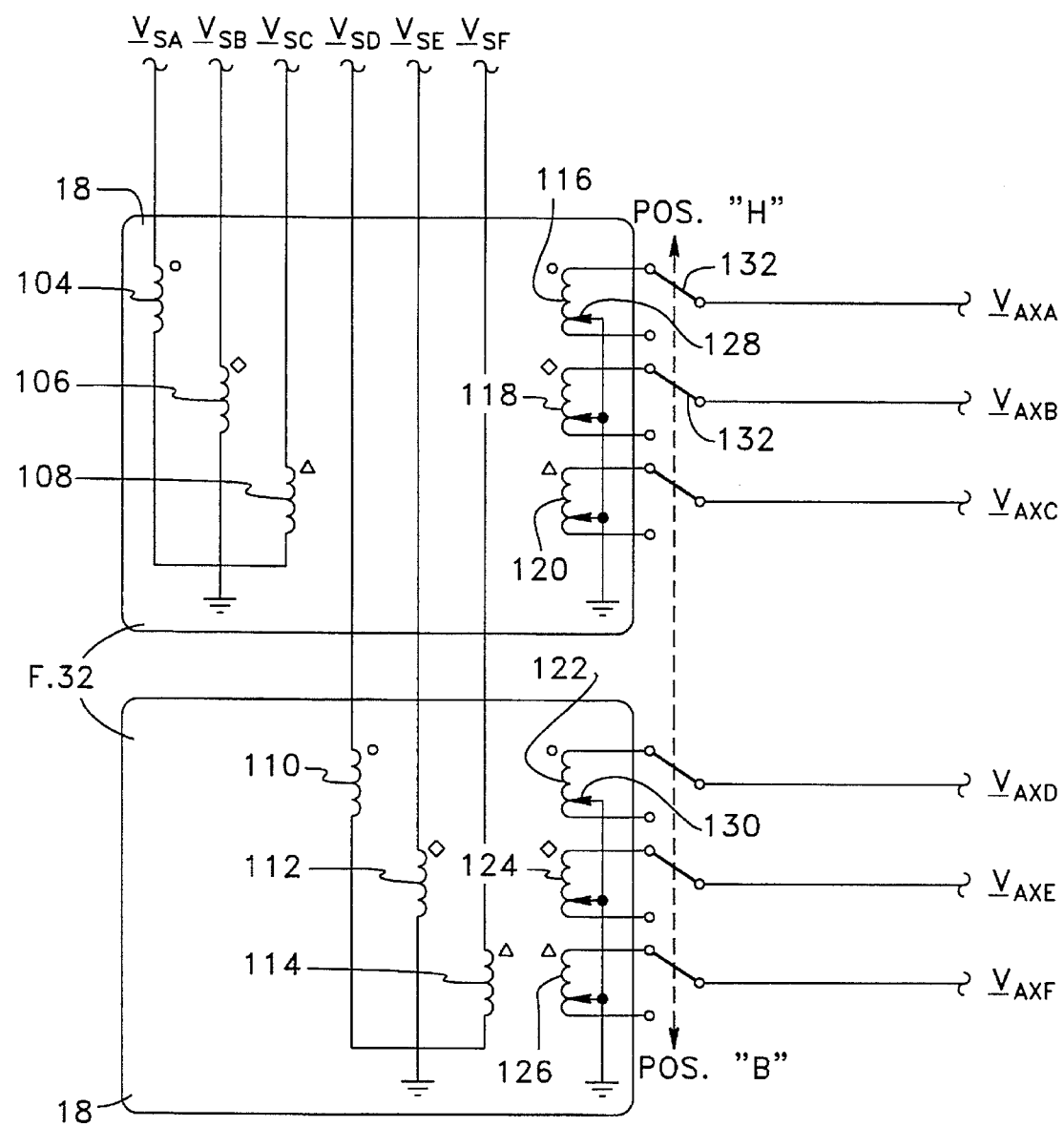
FIG. 32 is a circuit diagram showing excitation transformer arrangements for the phase-shifting interconnecting apparatus shown in FIG. 30.

Referring to FIG. 30, there is shown an embodiment of a phase-shifting interconnecting apparatus for hexaphase AC networks. The principles involved in phase-shifting the voltages applied to the susceptances 12, 14 are the same as for three-phase AC networks, except that the number of phase lines to interconnect is doubled. Example of series transformer arrangements F.31 and excitation transformer arrangements F.32 for the apparatus are respectively shown in FIGS. 31 and 32. All of the series transformer arrangements F.31 are provided by first and second three-phase transformers both having three pairs of primary windings 80, 82, 84, and 86, 88, 90 magnetically coupled respectively with three Δ-connected secondary windings 92, 94, 96, and 98, 100, 102. All of the excitation transformer arrangements F.32 are provided by third and forth three-phase transformers both having three primary windings 104, 106, 108, and 110, 112, 114 magnetically coupled respectively with three secondary windings 116, 118, 120 and 122, 124, 126 with grounded tap changers 128, 130. Each of the primary windings 104, 106, 108, and 110, 112, 114 of the third and forth three-phase transformers are connected between a ground and a corresponding one of the first branch points 8. Each of the secondary windings 116, 118, 120, and 122, 124, 126 of the third and forth three-phase transformers are connected to a corresponding interconnecting point of the Δ-connected secondary windings 92, 94, 96, and 98, 100, 102.

Figure 33:
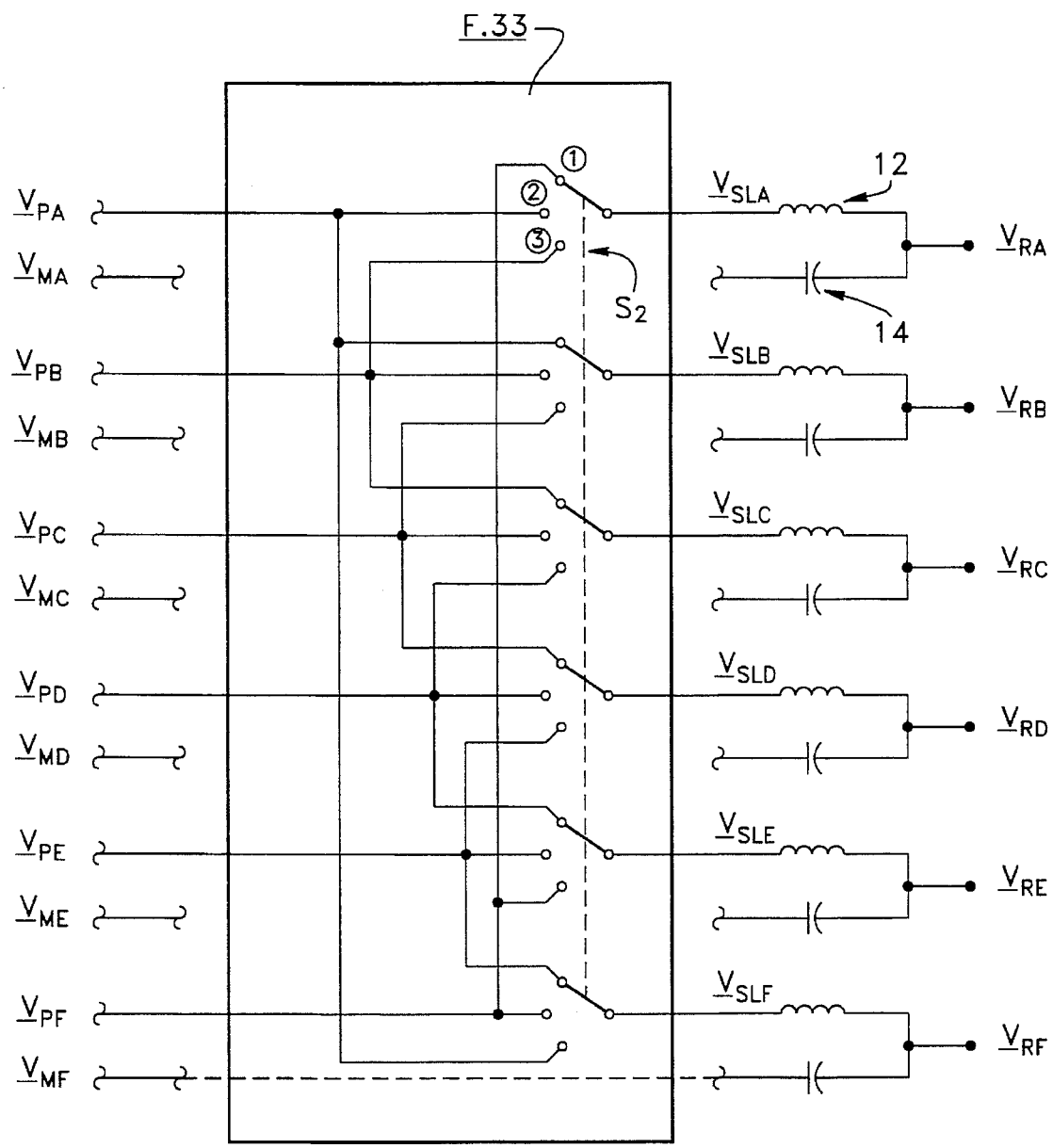
FIG. 33 is a circuit diagram showing a mode selecting switch circuit for the phase-shifting interconnecting apparatus shown in FIG. 30.

The three modes of operation of the apparatus are selected by means of a mode selecting switch circuit connected between the series transformer arrangements F.31 and the susceptances 12, 14 as shown in FIG. 33, in combination with other switches 132 connected between the series transformer arrangements F.31 and the excitation transformer arrangements F.32. The characteristics pertaining to each mode of operation are reported in a table in FIG. 34, for a phase A of the hexaphase AC networks. The characteristics for the other phases are obtained by replacing the subscripts by the cyclic permutation A→B→C→D→E→F→A.

Figure 35:
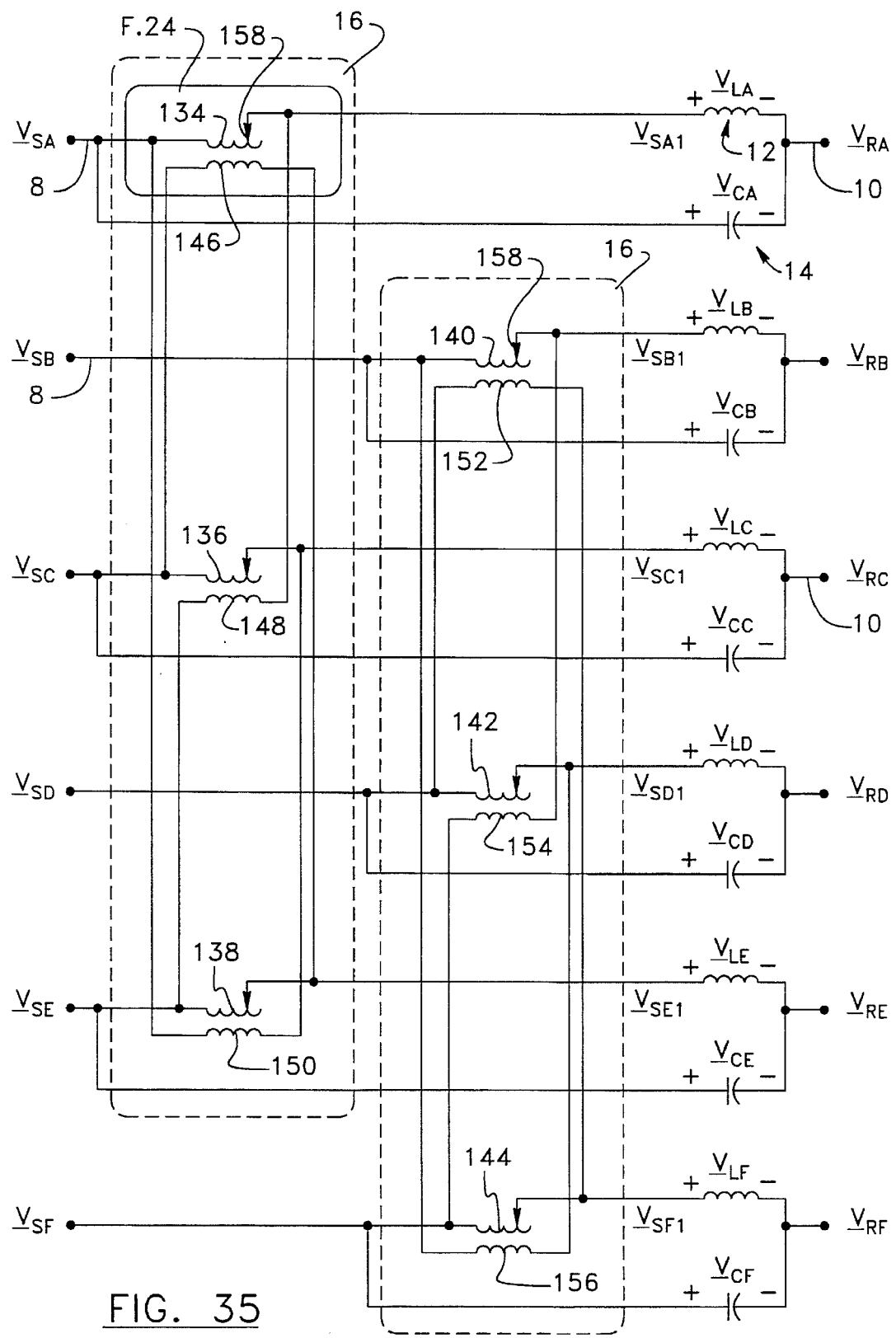
FIG. 35 is a circuit diagram showing a phase-shifting interconnecting apparatus having phase-shifting transformer arrangements in a squashed delta configuration for hexaphase networks.

FIG. 35 shows another embodiment of a phase-shifting interconnecting apparatus for hexaphase AC networks, having series transformer arrangements 16 in a squashed delta configuration. All of the series transformer means are provided by first and second three-phase transformers both having three primary windings 134, 136, 138, and 140, 142, 144 magnetically coupled respectively with three secondary windings 146, 148, 150, and 152, 154, 156. Each of the primary windings 134, 136, 138, and 140, 142, 144 is provided with a tap terminal 158 connected to a corresponding one of the susceptances 12, 14. Each of the secondary windings 146, 148, 150 and 152, 154, 156 is connected between a corresponding one of the first branch points 8 and one of the tap terminals 158.

Figure 36:
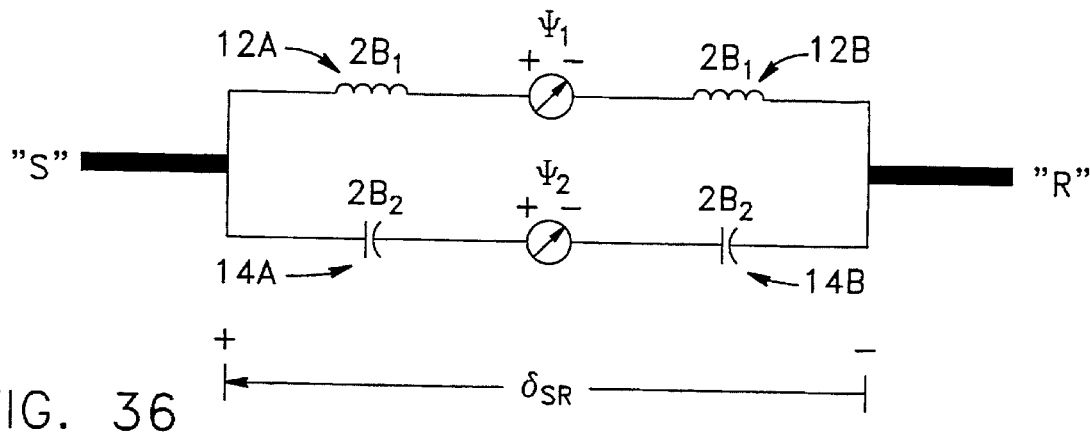
FIGS. 36, 37 and 38 are schematic diagrams of circuit branches of a phase-shifting interconnecting apparatus, having susceptances divided in two equal parts.
Figure 37:
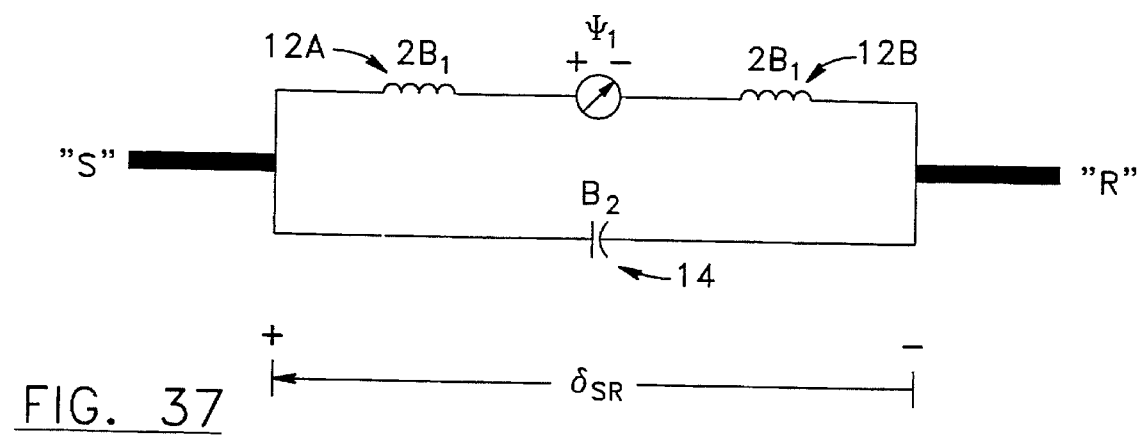
Figure 38:
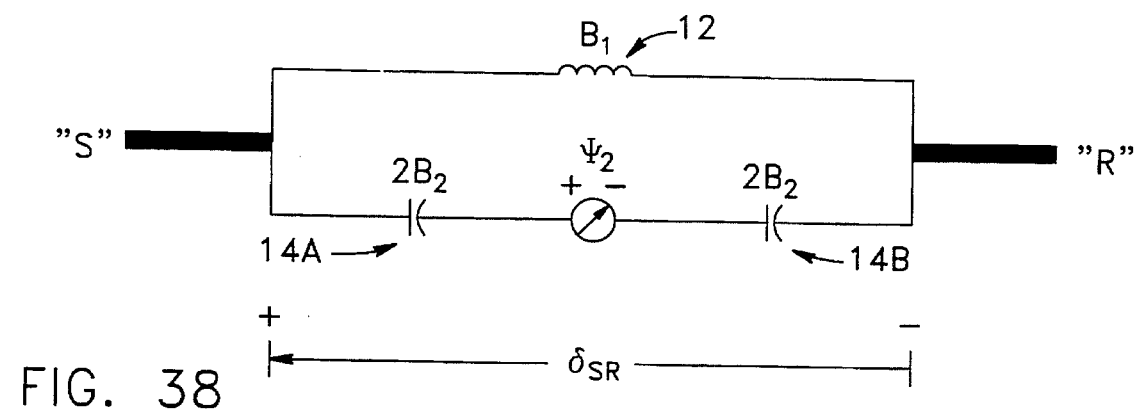

Referring to FIGS. 36, 37 and 38, the susceptances of the phase-shifting interconnecting apparatus can be divided in two equal parts for protecting the phase-shifting device(s) against high fault currents. The power characteristics of the interconnecting apparatus remain the same.

Although the present invention has been explained hereinafter by way of preferred embodiments thereof, it should be pointed out that any modifications to these preferred embodiments, within the scope of the appended claims, are not deemed to change or alter the nature and scope of the present invention.

We claim:

1. A phase-shifting interconnecting apparatus for interconnecting respective phase lines of first and second synchronous polyphase AC networks, said apparatus comprising, for each pair of respective phase lines subjected to an interconnection:

a pair of circuit branches in parallel, having first and second common branch points provided with connecting means for connecting respectively said branch points to said respective phase lines, said circuit branches including respectively inductive and capacitive susceptances; and series transformer means for phase-shifting a voltage applied to at least one of said susceptances, said series transformer means including at least one primary winding having at least a portion connected in series with said at least one of said susceptances, and at least one secondary winding having at least a portion adapted to receive an excitation voltage derived from said AC networks, said excitation voltage having a phase angle with respect to a phase voltage provided by one of said respective phase lines, whereby, in operation, said excitation voltage combines through said transformer with said phase voltage to cause phase-shifting of the voltage applied to said at least one of said susceptances.

2. A phase-shifting interconnecting apparatus according to claim 1, further comprising:

means for changing an angle of phase-shifting produced by each said series transformer means.

3. A phase-shifting interconnecting apparatus according to claim 2, wherein said means for changing comprise a tap changer associated with each said at least one primary winding, to adjust said at least a portion thereof connected in series with said at least one of said susceptances.

4. A phase-shifting interconnecting apparatus according to claim 2, wherein said means for changing comprise excitation transformer means for modulating each said excitation voltage, said excitation transformer means having primary windings arranged respectively to receive phase voltages of said first AC network, and secondary windings provided with tap changers or adjusters, for producing respectively adjustable voltages in phase with the phase voltages of the first AC network, each said excitation voltage being derived from at least a corresponding one of said adjustable voltages.

5. A phase-shifting interconnecting apparatus according to claim 1, wherein each said series transformer means has two primary windings each having at least a portion connected in series with a corresponding one of said susceptances.

6. A phase-shifting interconnecting apparatus according to claim 4, wherein each said series transformer means has two primary windings each having at least a portion connected in series with a corresponding one of said susceptances.

7. A phase-shifting interconnecting apparatus according to claim 1, wherein each said capacitive susceptance comprises at least one capacitor, and each said inductive susceptance comprises at least one inductor.

8. A phase-shifting interconnecting apparatus according to claim 1, further comprising power reversal switch means connected between said susceptances and said series transformer means, for providing a plurality of selectively opened or closed electrical paths therebetween.

9. A phase-shifting interconnecting apparatus according to claim 4, further comprising power reversal switch means connected between said series transformer means and said excitation transformer means, for providing a plurality of selectively opened or closed electrical paths therebetween.

10. A phase-shifting interconnecting apparatus according to claim 6, wherein both of said polyphase AC networks are three-phase AC networks, all of said series transformer means being provided by a first three-phase transformer having three pairs of primary windings magnetically coupled respectively with three Δ-connected secondary windings, all of said excitation transformer means being provided by a second three-phase transformer having three primary windings magnetically coupled respectively with three secondary windings with grounded tap changers, each of said primary windings of the second three-phase transformer being connected between a ground and a corresponding one of said first branch points, each of said secondary windings of the second three-phase transformer being connected to a corresponding interconnecting point of said Δ-connected secondary windings of the first three-phase transformer.

11. A phase-shifting interconnecting apparatus according to claim 6, wherein both of said polyphase AC networks are three-phase AC networks, all of said series transformer means being provided by a first three-phase transformer having three pairs of primary windings magnetically coupled respectively with three ground-connected secondary windings, all of said excitation transformer means being provided by a second three-phase transformer having three primary windings magnetically coupled respectively with three secondary windings with grounded tap changers, each of said primary windings of the second three-phase transformer being connected between a ground and a corresponding one of said first branch points, each of said secondary windings of the second three-phase transformer being connected to a corresponding one of said ground-connected secondary windings of the first three-phase transformer.

12. A phase-shifting interconnecting apparatus according to claim 11, wherein both of said polyphase AC networks are three-phase AC networks, all of said series transformer means being provided by first and second three-phase transformers each having three primary windings magnetically coupled respectively with three Δ-connected secondary windings, all of said excitation transformer means being provided by a third three-phase transformer having three primary windings magnetically coupled respectively with three pairs of secondary windings with grounded tap changers, each of said primary windings of the third three-phase transformer being connected between a ground and a corresponding one of said first branch points, each of said pairs of said secondary windings of the third three-phase transformer being connected to corresponding interconnecting points of said Δ-connected secondary windings of the first and second three-phase transformer respectively, said first three-phase transformer being coupled with said inductive susceptances while said second three-phase transformer being coupled with said capacitive susceptances.

13. A phase-shifting interconnecting apparatus according to claim 5, wherein both polyphase AC networks are three-phase AC networks, all of said series transformer means being provided by a three-phase transformer having three pairs of primary windings magnetically coupled respectively with three Δ-connected secondary windings, each of said first branch points being connected to a corresponding interconnecting point of said Δ-connected secondary windings of the three-phase transformer.

14. A phase-shifting interconnecting apparatus according to claim 5, wherein both polyphase AC networks are three-phase AC networks, all of said series transformer means being provided by a three-phase transformer having three pairs of primary windings magnetically coupled respectively with three ground-connected secondary windings, each of said first branch points being connected to a corresponding one of said ground-connected secondary windings of the three-phase transformer.

15. A phase-shifting interconnecting apparatus according to claim 1, wherein both polyphase AC networks are three-phase AC networks, all of said series transformer means being provided by a three-phase transformer having three primary windings magnetically coupled respectively with three ground-connected secondary windings, each of said first branch points being connected to a corresponding one of said ground-connected secondary windings of the three-phase transformer.

16. A phase-shifting interconnecting apparatus according to claim 1, wherein both polyphase AC networks are three-phase AC networks, all of said series transformer means being provided by a three-phase transformer having three primary windings magnetically coupled respectively with three secondary windings, each of said primary windings being provided with a tap terminal connected to a corresponding one of said susceptances, each of said secondary windings being connected between a corresponding one of said first branch points and one of said tap terminals.

17. A phase-shifting interconnecting apparatus according to claim 1, wherein both polyphase AC networks are three-phase AC networks, all of said series transformer means being provided by a first three-phase transformer having three primary windings magnetically coupled respectively with three Δ-connected secondary windings, all of said excitation transformer means being provided by a second three-phase transformer having three primary windings magnetically coupled respectively with three secondary windings with grounded tap changers, each of said primary windings of the first three-phase transformer being provided with a tap terminal, each of said primary windings of the second three-phase transformer being connected between a ground and a corresponding one of said tap terminals, each of said secondary windings of the second three-phase transformer being connected to a corresponding interconnecting point of said Δ-connected secondary windings of the first three-phase transformer.

18. A phase-shifting interconnecting apparatus according to claim 6, wherein said polyphase AC networks are hexaphase AC networks, all of said series transformer means being provided by first and second three-phase transformers both having three pairs of primary windings magnetically coupled respectively with three Δ-connected secondary windings, all of said excitation transformer means being provided by third and forth three-phase transformers both having three primary windings magnetically coupled respectively with three secondary windings with grounded tap changers, each of said primary windings of the third and forth three-phase transformers being connected between a ground and a corresponding one of said first branch points, each of said secondary windings of the third and forth three-phase transformers being connected to a corresponding interconnecting point of said Δ-connected secondary windings.

19. A phase-shifting interconnecting apparatus according to claim 18, further comprising mode switch means connected between said susceptances and said series transformer means, for providing a plurality of selectively opened or closed electrical paths therebetween.

20. A phase-shifting interconnecting apparatus according to claim 1, wherein said polyphase AC networks are hexaphase AC networks, all of said series transformer means being provided by first and second three-phase transformers both having three primary windings magnetically coupled respectively with three secondary windings, each of said primary windings being provided with a tap terminal connected to a corresponding one of said susceptances, each of said secondary windings being connected between a corresponding one of said first branch points and one of said tap terminals.

21. A phase-shifting interconnecting apparatus according to claim 1, wherein said at least one of said susceptances is divided in two equal parts on both sides of said at least a portion of said at least one primary winding.

* * * * *